United States Patent
Rajagopal et al.

(10) Patent No.: US 8,107,825 B2
(45) Date of Patent: Jan. 31, 2012

(54) APPARATUS AND METHOD FOR SUPPORT OF DIMMING IN VISIBLE LIGHT COMMUNICATION

(75) Inventors: Sridhar Rajagopal, Plano, TX (US); Ying Li, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 47 days.

(21) Appl. No.: 12/577,548

(22) Filed: Oct. 12, 2009

(65) Prior Publication Data
US 2010/0284690 A1 Nov. 11, 2010

Related U.S. Application Data

(60) Provisional application No. 61/215,760, filed on May 8, 2009.

(51) Int. Cl.
*H04B 10/00* (2006.01)
(52) U.S. Cl. .................. 398/172; 398/189; 398/197
(58) Field of Classification Search .......... 398/182–183, 398/186–187, 196–197
See application file for complete search history.

(56) References Cited

U.S. PATENT DOCUMENTS

| | | |
|---|---|---|
| 7,102,902 B1 | 9/2006 | Brown et al. |
| 7,321,203 B2 | 1/2008 | Marosek |
| 7,570,246 B2 * | 8/2009 | Maniam et al. ............... 345/102 |
| 2004/0051485 A1 | 3/2004 | Chansky et al. |
| 2006/0239689 A1 | 10/2006 | Ashdown |
| 2007/0092264 A1 * | 4/2007 | Suzuki et al. ................. 398/189 |
| 2008/0252575 A1 * | 10/2008 | Brown ............................. 345/83 |
| 2008/0315778 A1 * | 12/2008 | Tatsukawa ..................... 315/193 |
| 2009/0091560 A1 * | 4/2009 | Ferguson ....................... 345/207 |
| 2009/0129782 A1 | 5/2009 | Pederson |
| 2010/0135669 A1 | 6/2010 | Kim et al. |

FOREIGN PATENT DOCUMENTS

WO WO 2008/025153 A1 3/2008

OTHER PUBLICATIONS

Hidemitsu Sugiyama, et al., "Brightness Control Methods for Illumination and Visible-Light Communication Systems", IEEE International Conference on Wireless and Mobile Communications, 2007, 6 pages.
"Energy Star® Program Requirements for Integral LED Lamps", Draft Jan. 16, 2009, p. 1-6.
Michael Day, Texas Instruments, "PWM dimming enhances color purity in high-end LED video displays", Oct. 31, 2005, p. 1-5.
International Search Report dated Dec. 20, 2010 in connection with International Patent Application No. PCT/KR2010/002967.

* cited by examiner

*Primary Examiner* — Dzung Tran

(57) ABSTRACT

A method and system for visible light communication (VLC) for use in a dimmable lighting environment is provided. The method includes transmitting data using light from at least one light source, a brightness of the light reduced below a maximum level. The method also includes compensating or accommodating for the reduced brightness of the light at a VLC circuitry to maintain communication. The method further includes transmitting data to at least one VLC receiver using the light from the at least one light source.

35 Claims, 19 Drawing Sheets

APPARATUS AND METHOD FOR SUPPORT OF DIMMING IN VISIBLE LIGHT COMMUNICATION

CROSS-REFERENCE TO RELATED APPLICATION(S) AND CLAIM OF PRIORITY

The present application is related to U.S. Provisional Patent Application No. 61/215,760, filed May 8, 2009, entitled "DIMMING MECHANISMS FOR VISIBLE LIGHT COMMUNICATION". Provisional Patent Application No. 61/215,760 is assigned to the assignee of the present application and is hereby incorporated by reference into the present application as if fully set forth herein. The present application hereby claims priority under 35 U.S.C. §119(e) to U.S. Provisional Patent Application No. 61/215,760.

TECHNICAL FIELD OF THE INVENTION

The present application relates generally to visible light optical communication and, more specifically, to support of dimming mechanisms and methods for use in visible light communication.

BACKGROUND OF THE INVENTION

Visible light communication (VLC) is a new technology for short-range optical wireless communication using visible light in optically transparent media. This technology provides access to several hundred terahertz (THz) of unlicensed spectrum. VLC is immune to the problems of electromagnetic interference and non-interference associated with radio frequency (RF) systems. VLC provides an additional level of security by allowing a user to see the transmission of data across the communication channel. Another benefit of VLC is that it augments and complements existing services (such as illumination, display, indication, decoration, etc.) from existing visible-light infrastructures. A VLC network is any network of two or more devices that engage in VLC.

FIG. 1 depicts the full electromagnetic frequency spectrum, and a breakout of the wavelengths occupied by visible light. The visible light spectrum extends from approximately 380 to 780 nm in wavelength, which corresponds to a frequency range of approximately 400 to 790 THz. Since this spectrum is large and can support light sources with multiple colors, VLC technology can provide a large number of channels for communication Lighting infrastructures in many residential, office and industrial areas have dimming circuits associated with the lighting. Lighting controls are used to enhance personal comfort, extend the lifetime of the lighting sources, and save energy. Every person has different visual abilities and comfort levels. Light dimming provides a solution to optimize a person's environment to his or her convenience and comfort.

SUMMARY OF THE INVENTION

A method for visible light communication (VLC) for use in a dimmable lighting environment is provided. The method includes transmitting light from at least one light source, a brightness of the light reduced below a maximum level. The method also includes compensating for the reduced brightness of the light at a VLC circuitry. The method further includes transmitting data to at least one VLC receiver using the light from the at least one light source.

A second method for visible light communication (VLC) for use in a dimmable lighting environment is provided. The method includes transmitting light from at least one light source, a brightness of the light reduced below a maximum level. The method also includes, at a VLC circuitry, accommodating for the reduced brightness of the light. The method further includes transmitting data to at least one VLC receiver using the light from the at least one light source.

A system for visible light communication in a dimmable lighting environment is provided. The system includes at least one light source, each light source configured to transmit light and transmit data to a VLC receiver using the light. The system also includes a dimmer circuitry configured to reduce a brightness of the light from the at least one light source below a maximum level. The system further includes a VLC circuitry configured to compensate for the reduced brightness of the light.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged visible light communication network.

The following documents and standards descriptions are hereby incorporated into the present disclosure as if fully set forth herein:

U.S. Pat. No. 7,102,902 to Brown, et al., titled "Dimmer Circuit for LED".

U.S. Pat. No. 7,321,203 to Marosek, titled "LED Dimming Control Technique for Increasing the Maximum PWM Dimming Ratio and Avoiding LED Flicker".

H. Sugiyama, S. Haruyama, M. Nakagawa, *Brightness Control Methods for Illumination and Visible Light Communication Systems*, IEEE International Conference on Wireless and Mobile Communications, 2007.

ENERGY STAR® Program Requirements for Integral LED Lamps, draft Jan. 16, 2009, found at the time of filing at www.energystar.gov/ia/partners/prod_development/revisions/downloads/lighting/ESInteg ralLampsCriteria_Draft1.pdf.

Michael Day, *PWM Dimming Enhances Color Purity in High-end LED video displays*, Oct. 31, 2005, found at the time of filing at www.eeproductcenter.com/passives/showArticle.jhtml?articleID=173401243.

Additional information relevant to the present disclosure may be found at the time of filing at www.dali-ag.org and www.vlcc.net.

The introduction of light emitting diode (LED) bulbs to replace incandescent or fluorescent bulbs has created many new challenges. LEDs typically operate on DC current, and therefore have to be converted to work with AC current. Furthermore, the standard AC voltage can vary in different parts of the world. Power factor correction and energy efficiency are also becoming increasingly subject to government energy regulations. LEDs hold an advantage over compact fluorescent lamps (CFLs) in the fact that LEDs can be easily used with dimmer circuits, while CFLs cannot. Dimming support is also one of the requirements being proposed for ENERGY STAR® certification by the U.S. Department of Energy.

Figure 1:
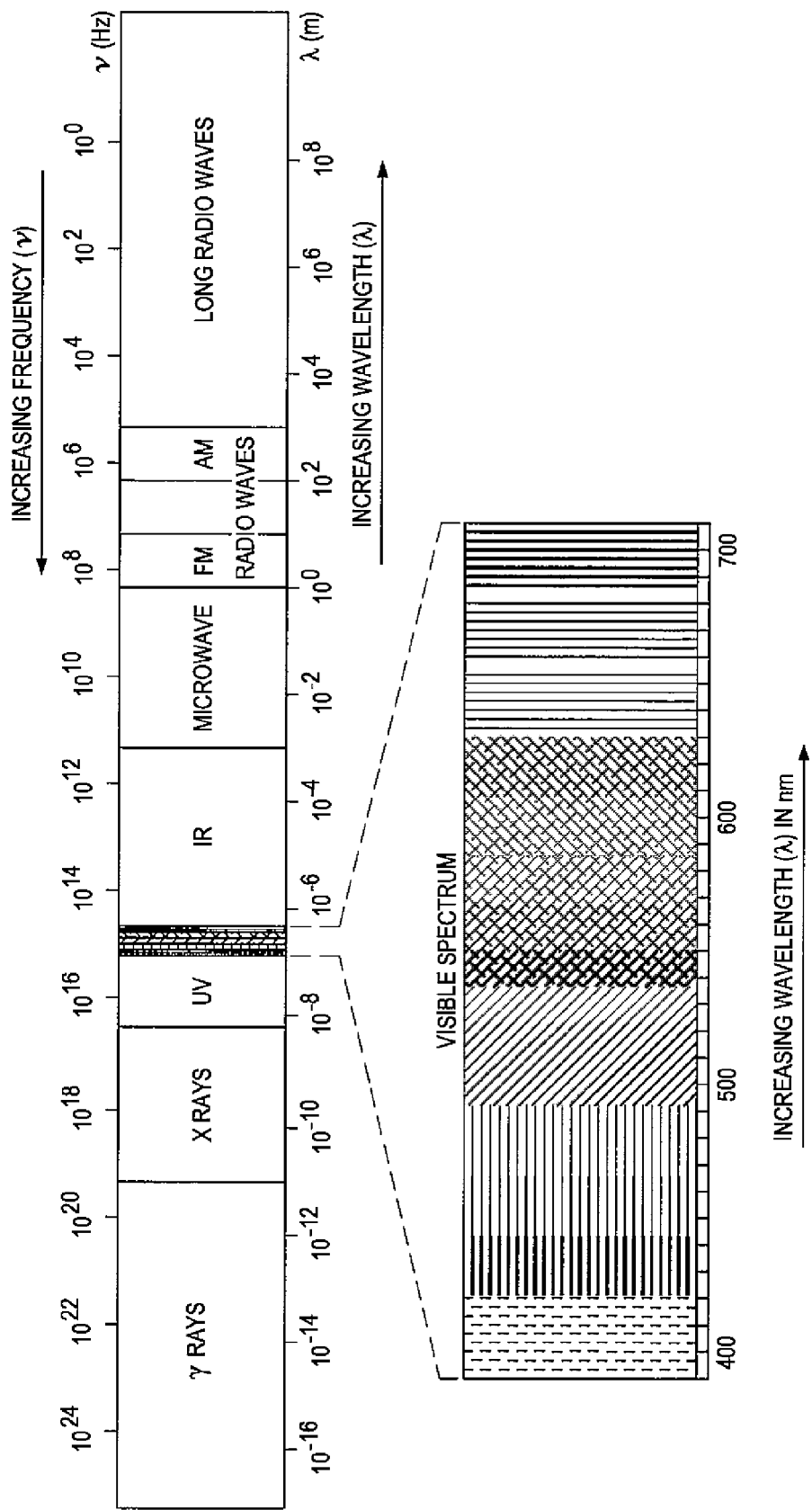
FIG. 1 depicts the full electromagnetic frequency spectrum, and a breakout of the wavelengths occupied by visible light.
Figure 2:
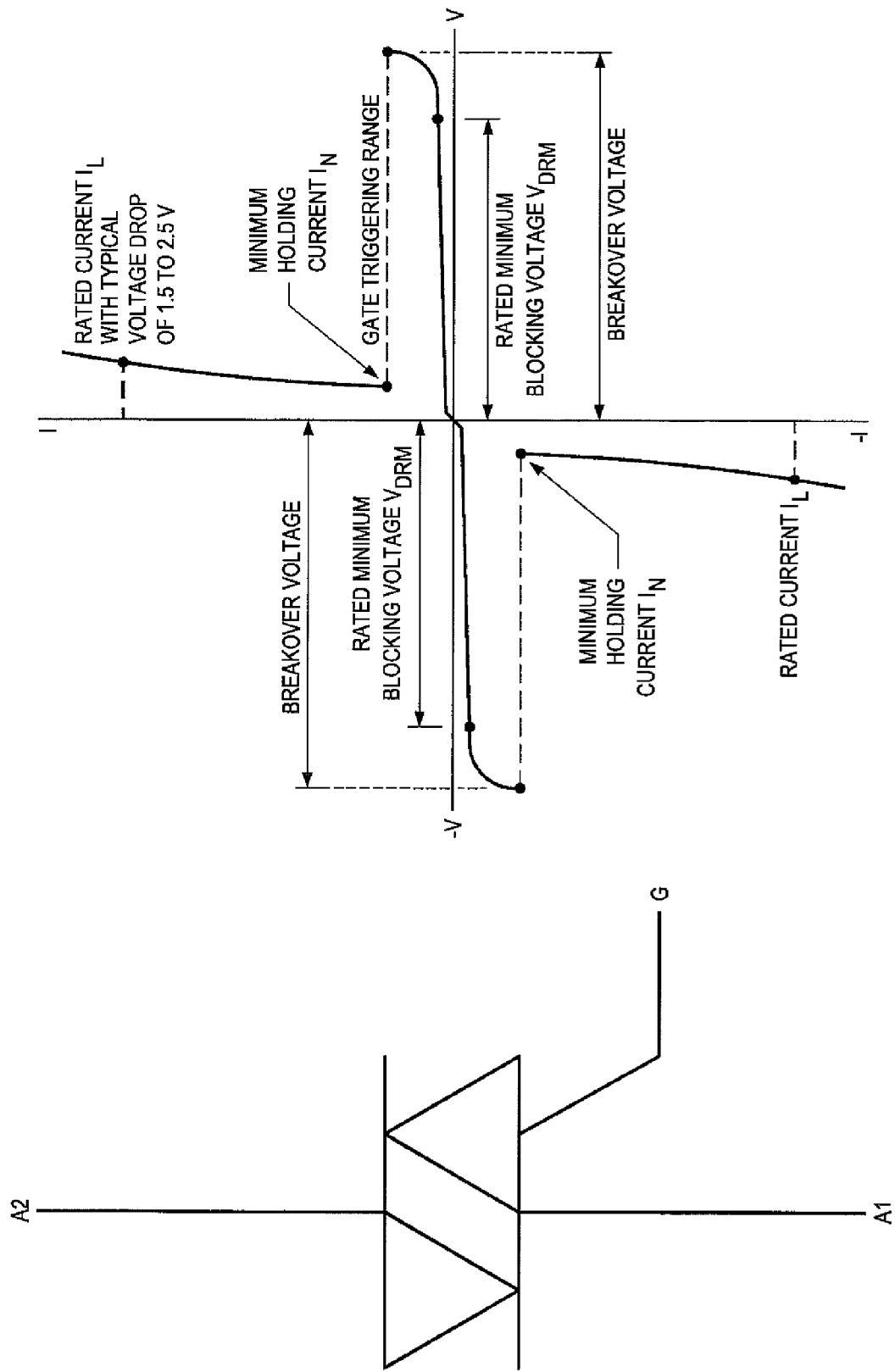
FIG. 2 depicts a schematic and voltage/current curves for a triac used in dimming.
Figure 3:
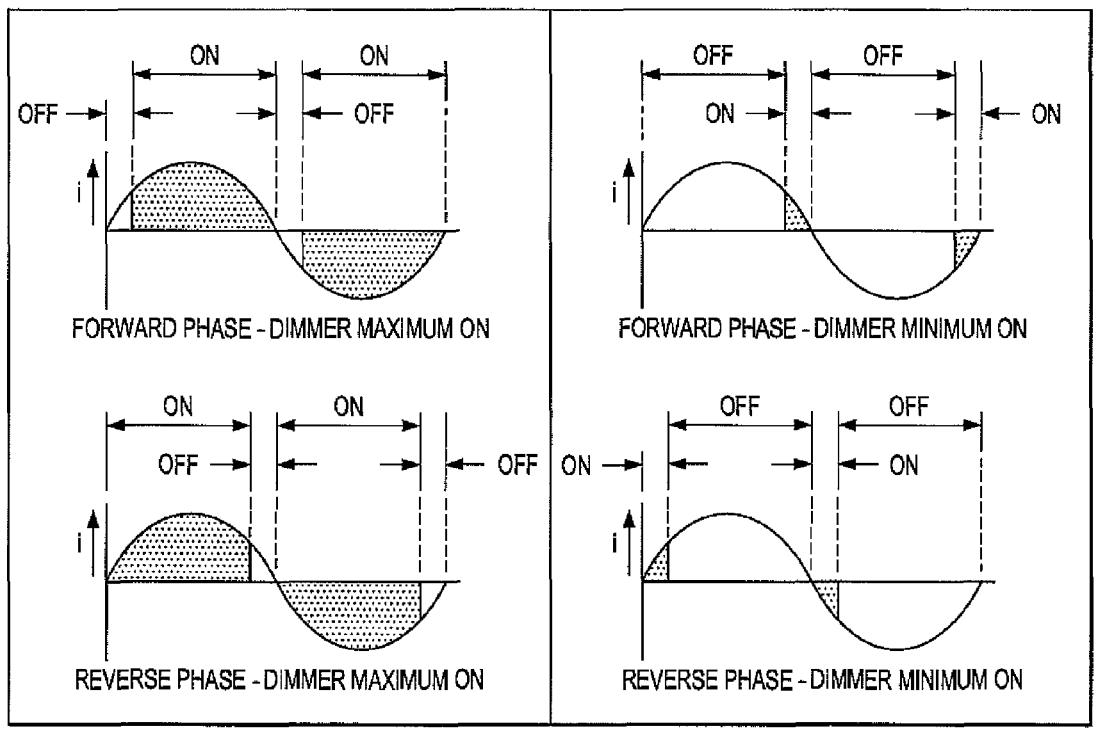
FIG. 3 depicts diagrams illustrating phase responses of triac based dimmers.

FIG. 2 depicts a schematic and voltage/current curves for a triac. A triac-based dimmer is the most popular dimming method today used in incandescent bulbs. As shown in FIG. 2, a triac is used to enable or disable current based on a gate voltage. By adjusting the gate voltage in response to a dimmer setting, the triac can be used to adjust the current flowing into the incandescent bulb. Depending on the type of circuit used (inductor or capacitor type), forward or reverse phase dimmers are possible. By adjusting the dimmer control, the triac triggers the output at different phases of the input AC mains sine wave, thereby varying the current through the incandescent bulb. This is shown in the diagrams in FIG. 3.

Figure 4:
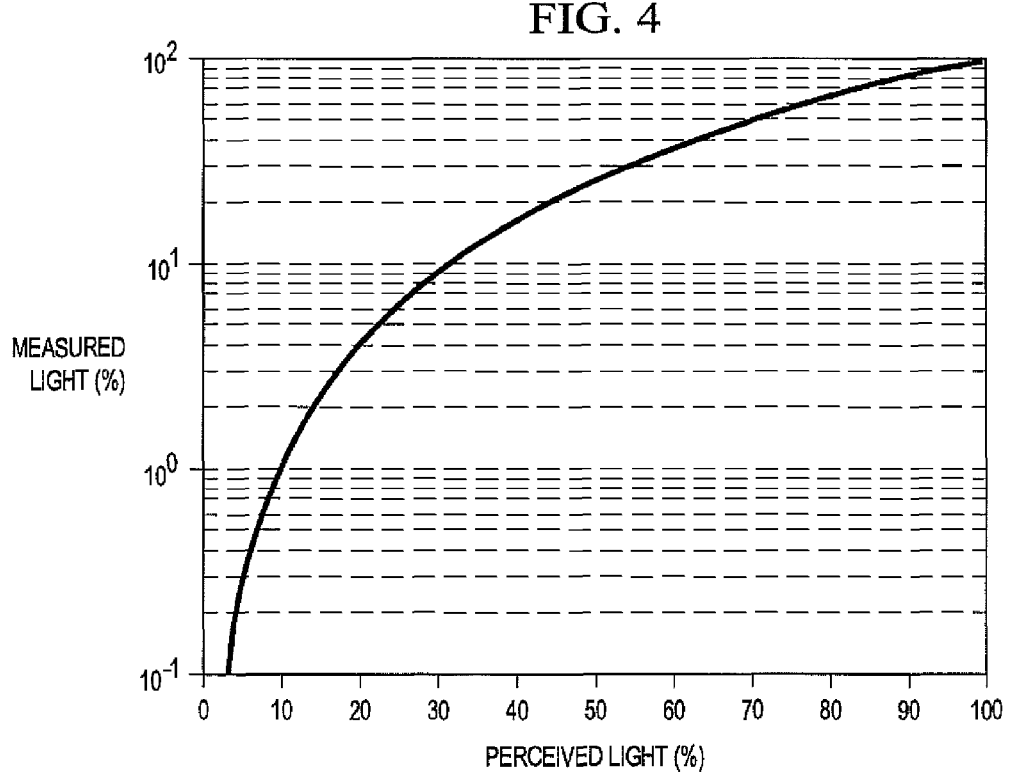
FIG. 4 shows a graph depicting the human eye's perception of light of increasing brightness.

FIG. 4 shows a graph depicting the human eye's perception of light of increasing brightness. As seen in the graph, the human eye has a non-linear response to the light level. At low light levels, the amount of light that a human eye perceives is greater than the actual light present in the room, based on a light measurement from a lux meter. This implies that there is a need for bulbs to provide a wide range of dimming levels. The light intensity could vary between 0.1-100% in order to have the greatest useful dimming range for a human user.

Figure 5:
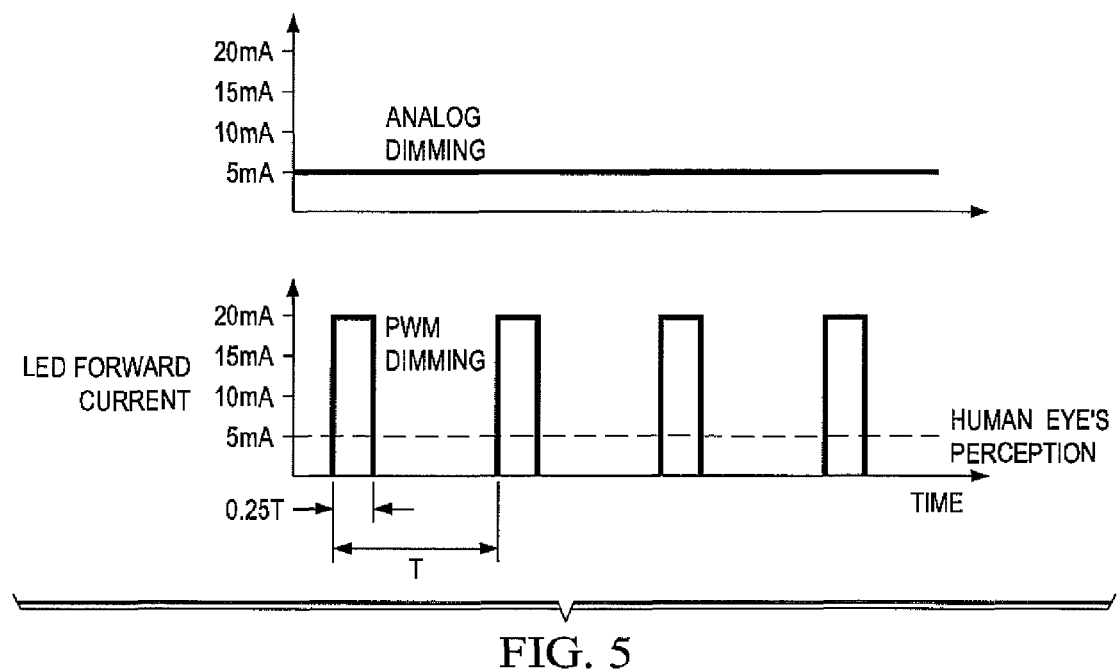
FIG. 5 illustrates two different methods of dimming for LEDs: analog and pulse width modulation.

FIG. 5 illustrates two different methods of dimming for use with LEDs: analog and pulse width modulation (PWM). With analog dimming, LED brightness is controlled by changing the LED current. As shown in the top graph of FIG. 5, a reduced current reduces the LED brightness. In contrast, PWM dimming maintains the full forward current during dimming. The reduction in LED brightness is achieved by modulating the total amount of time for the forward current flow. As shown in FIG. 5, the forward current in the PWM graph is four times the current of the analog graph. However, the pulse width is only one-fourth of the duty cycle. Since the human eye cannot perceive changes faster than 100 Hz, it perceives an average of the LED output based on its duty cycle. When the average of the duty cycle is reduced, the eye perceives the PWM output as a dimmer light, as indicated by the dotted line in FIG. 5. While analog dimming is simpler, the reduced current can cause a change in the LED color, which is a serious drawback compared to PWM dimming solutions.

Apart from using the power input to directly reduce supply current, there are other methods that can be used to control dimming. One alternative is to have an isolated low voltage link for dimmer control. This is useful to connect the dimmer to a wide range of sensors and devices. A commonly used analog control is the 0-10 V analog control, which sets the voltage to the light source based on the dimmer setting. This is set using the International Electrotechnical Commission (IEC) 60929 standard. A new standard called Digital Addressable Lighting Interface (DALI) is emerging as a popular international standard, also based on IEC 60929. DALI provides a digital interface for dimming with simple wiring, control of units, automatic dimming with logarithmic dimming behavior and other similar features. Operating parameters such as minimum/maximum fade level, fade time, and rate can be stored in ballast memory. DALI also provides queries to get the dimming factor and a variety of status messages.

Figure 6:
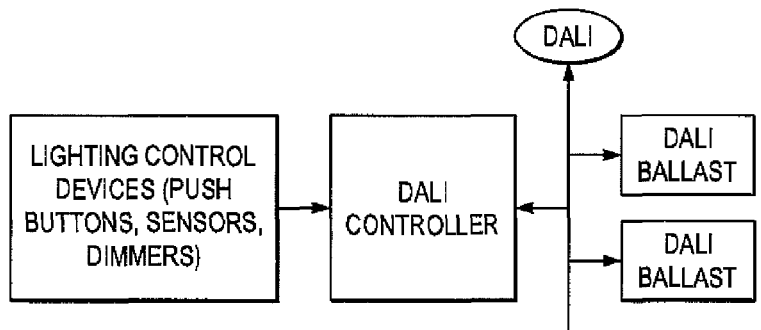
FIG. 6 shows a block diagram depicting a DALI interface between a DALI controller and ballasts.
Figure 7:
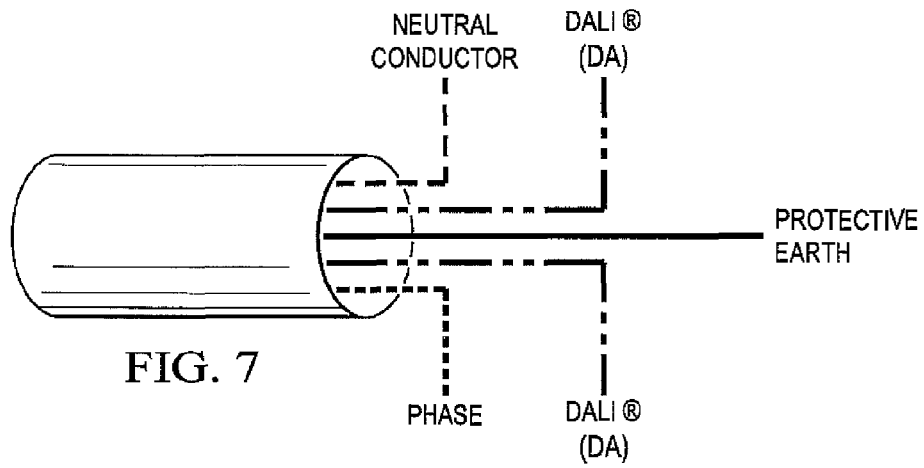
FIG. 7 depicts DALI interface wiring.

FIG. 6 shows a block diagram depicting a DALI interface between a DALI controller and ballasts. It is important to note that DALI is a software solution that provides digital control for dimming. The DALI interface is quite simple, adding two wires to the existing three wires in the cable going to the ballast. This is shown in FIG. 7. These two wires allow the digital control setting for the dimmer circuitry inside the ballast.

Table 1 shows typical messages that can be programmed via DALI for dimming. It is important to note that the DALI interface permits setting the light source values for dimming, as well as querying the light source.

TABLE 1

| DALI communication messages | |
|---|---|
| Typical DALI Message | Description |
| Go to light level xx | Sets light level from 0.1% to 100.0% |
| Go to minimum level | Set light level defined as lowest for this situation or setting |
| Turn lamp off | Turns the light off |
| Go to level compliant with situation xx | Sets light level at a predefined level |
| Query: What light level are you on? | Returns a number from 0.1% to 100.0% |
| Query: What is your status? | Returns a variety of status messages |

Figure 8:
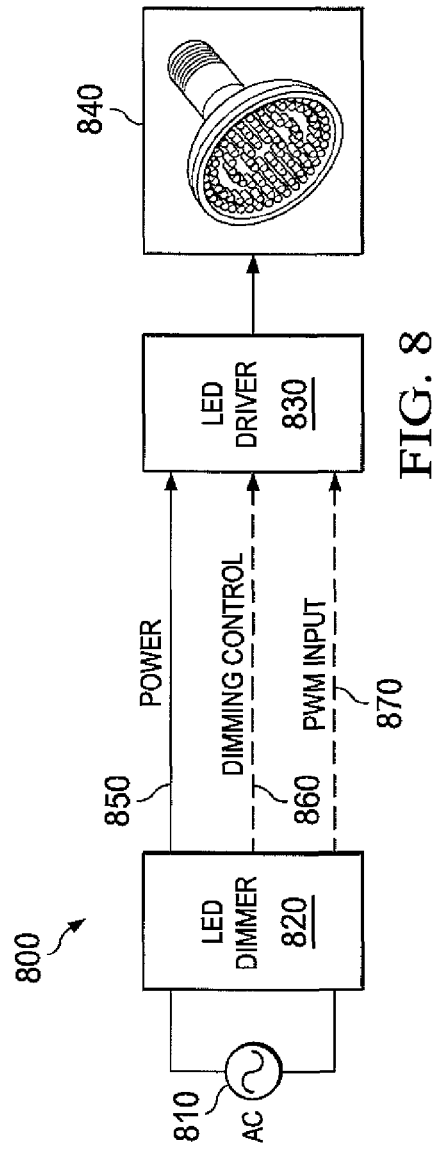
FIG. 8 depicts an LED dimmer interface according to one embodiment of the present disclosure.

FIG. 8 depicts an LED dimmer interface according to one embodiment of the present disclosure. Dimmer interface 800 includes a power source 810, an LED dimmer circuitry 820, an LED driver circuitry 830, and an LED light source 840. LED driver circuitry 830 receives power 850 from LED dimmer circuitry 820. In certain embodiments, dimmer interface 800 may include a digital dimming control 860, such as DALI, that provides a software control for dimming. In certain embodiments, dimmer interface 800 may also use an externally generated PWM input 870 for dimming. Since the dimming control 860 and PWM input 870 are optional interfaces to the driver, they are indicated with a dashed line in FIG. 8. Depending on the manufacturer, parts of LED dimmer 820 and LED driver 830 may be integrated on the same chip, or may be on separate chips.

The use of dimming for visible light communication is an unexplored topic that has only surfaced recently due to the IEEE 802.15.7 standardization. IEEE 802.15.7 describes the use of infrastructure devices, such as ambient light fixtures, as a communication device class. Other than IEEE 802.15.7, there is no known standard for wireless communication that has dimming support requirements.

The use of dimming in visible light communication raises several issues, including the following:

1) Currently, there is no globally accepted dimming standard with manufacturer dependent variations (although standards such as DALI are being developed to address this issue).

2) VLC may be affected by pulse width modulation (PWM) used in the drivers for dimming. If the dimmer circuit turns the LED off during part of the duty cycle, the LED cannot be used to transmit data during the "off" part of each cycle.

3) Depending on data transmission patterns, VLC may cause perceptible flicker in ambient light sources that are used as VLC transmitters.

The flicker effect caused by PWM has been considered in earlier proposals and patents. For example, the Visible Light Communications Consortium (VLCC) has proposed adjusting the ambient transmission power level in order to ensure the output level is kept consistent during communication. However, it is not clear how the idle time between the transmissions (inactive part) is handled. The signal that is sent during idle time can be static (constant over time), if dimming is not used. However, if PWM is used for dimming, the static signal cannot be used during dimming. Also, a static signal cannot convey any information. The present disclosure describes other types of signals that can be sent in this time period, and that can coexist with PWM and also carry useful information.

Figure 9:
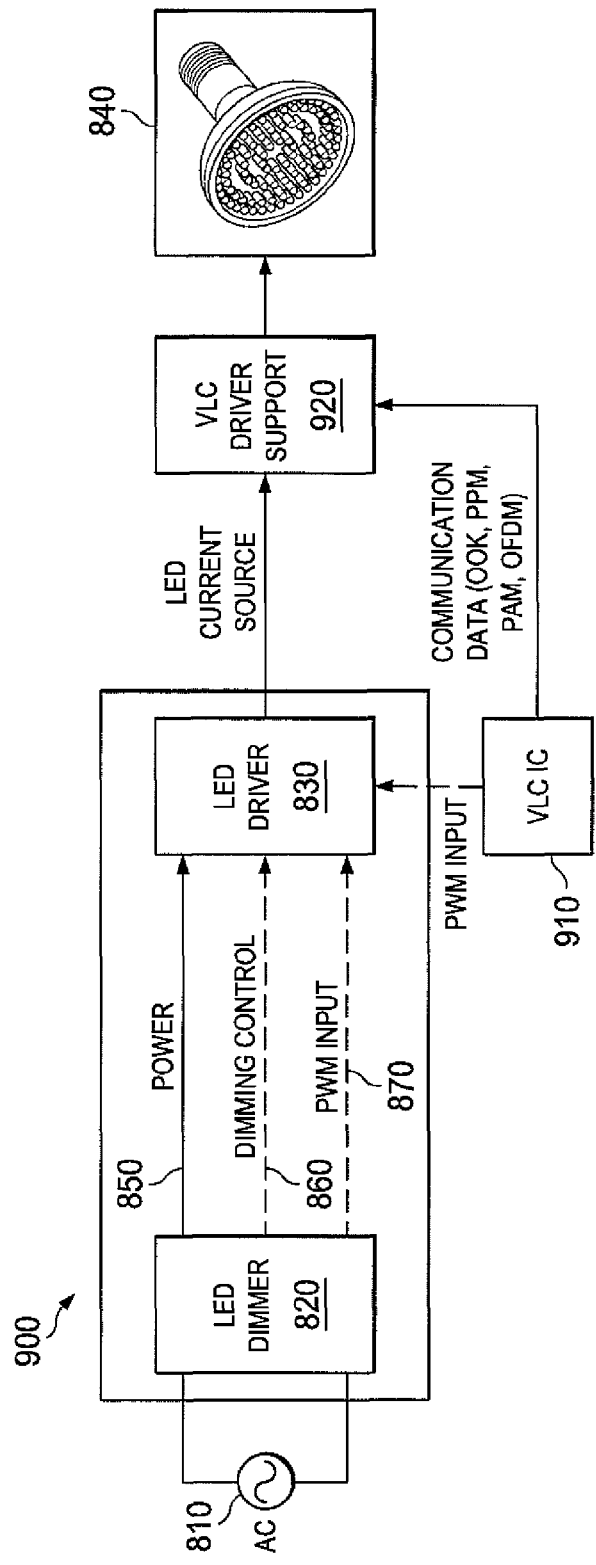
FIG. 9 depicts a VLC system with dimmer support, according to one embodiment of the present disclosure.

FIG. 9 depicts a VLC system with dimmer support, according to one embodiment of the present disclosure. System 900 includes LED dimmer interface 800. System 900 also includes a VLC circuitry 910 and a VLC driver support circuitry 920. VLC driver support circuitry 920 is optional in certain embodiments, depending on the complexity of the modulation and the data rates that need to be supported. There may also be different levels of integration for LED dimmer circuitry 820, LED driver circuitry 830, and VLC circuitry 910, depending on the manufacturer and reusability of existing dimmer circuits.

The VLC driver support circuitry 920 compensates for any loss in brightness due to modulation schemes used in VLC communication. In certain embodiments, there may be multiple outputs and inputs from the VLC circuitry 910 that interface with LED dimmer circuitry 820 and LED driver circuitry 830 in order to support dimming in the standard. Several embodiments are discussed below.

Since there are a number of different types of dimmer interfaces, it is helpful to understand the various types and how solutions can be developed to address each type. Dimmers can be classified based on the following properties:

Dimming type: Dimming may be analog or digital. If analog dimming is used, there is not much impact to VLC standardization. However, digital dimming using PWM may raise several issues, as described above.

Programmability: Certain dimmers and drivers allow the PWM input to be programmed from an external source. In this case, the VLC circuitry 910 can potentially drive the PWM input in a manner suitable for data transmission from the light source.

Switching speed: Although the light source may be able to switch at the modulation speed, there may be cases where the LED dimmer and driver circuits may not be able to switch at the modulation speed. This may be due to the fact that the circuits were not designed to support VLC, or due to other driver circuit limitations.

External dimming override: In certain embodiments, when VLC communication is in progress, it may be acceptable to temporarily override the dimmer control and allow the light to brighten. This may be useful to provide high data rate communication, even when the dimmer setting is set low. This can only be achieved via PWM dimming. This concept is explained in FIGS. 10A and 10B.

Figure 10A:
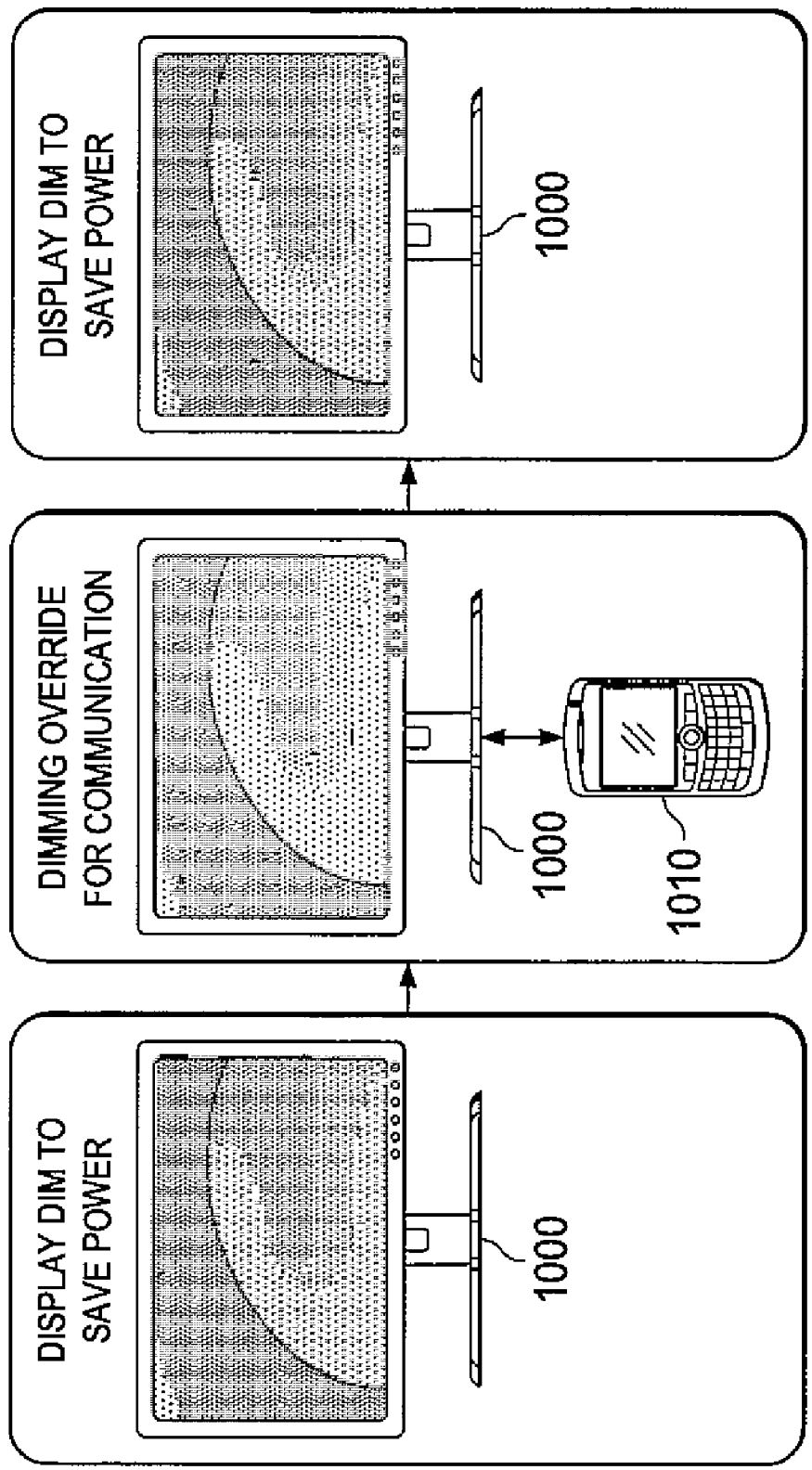
FIGS. 10A and 10B depict the brightness level over a period of time of an LED light source with dimming override, according to one embodiment of the present disclosure.
Figure 10B:
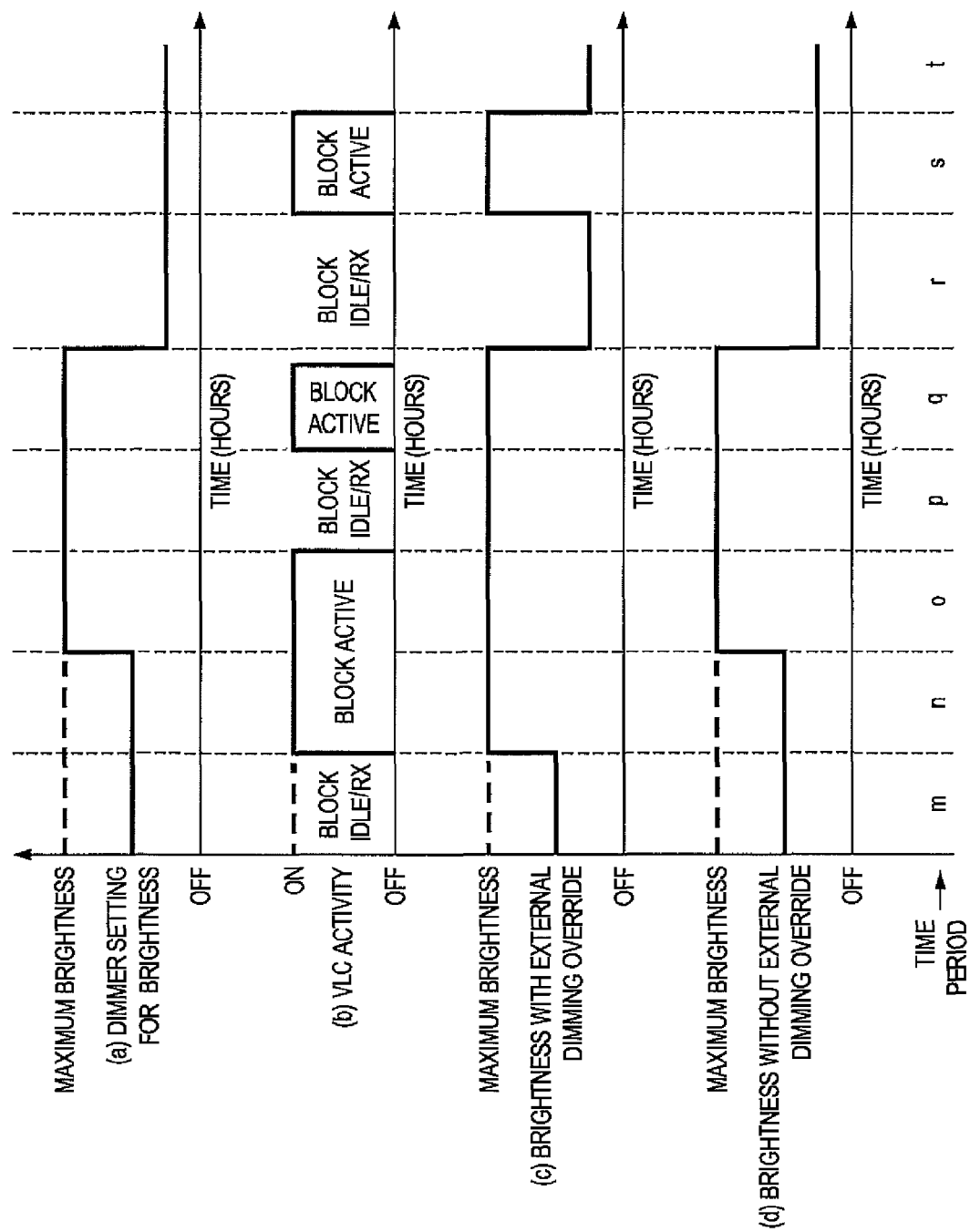

FIGS. 10A and 10B depict the brightness level over time of an LED light source that is subject to external dimming override, according to one embodiment of the present disclosure. FIG. 10A depicts an LED light source 1000 (e.g., an LED monitor) that has been dimmed to save power. When a VLC receiver 1010 establishes contact with LED light source 1000 in order to engage in VLC, a VLC controller overrides the dimming setting and LED light source 1000 brightens. In certain embodiments, the VLC controller may be disposed in LED light source 1000 or VLC receiver 1010. Once LED light source 1000 is brightened, VLC communication takes place between LED light source 1000 and VLC receiver 1010. When VLC communication is completed, the VLC controller releases control of the dimming setting, and LED light source 1000 once again dims to a power saving mode.

FIG. 10B graphically illustrates the brightness level over time of an LED light source (e.g., an LED lamp) that is subject to external dimming override. Graph (a) shows a brightness level over time for an LED light source that is not engaged in VLC. Over time, the brightness level is increased and decreased, perhaps as the result of a person in proximity of the light source manually adjusting a dimmer control. The person increases the brightness of the light at the start of time period o, and then reduces the light to a lower level at the start of time period r.

Graph (b) shows VLC activity that occurs over the same time period. VLC activity (i.e., data transmission) occurs during the active blocks in time periods n, o, q, and s. If the light source of graph (a) is the transmission source for the VLC activity, and the light source permits external dimming override, then graph (c) depicts the resulting brightness level of the light source over time. During time periods n and s, the dimmer setting is overridden and the brightness level is set to a maximum, in order for the light source to be able to transmit data via VLC. During the other time periods, the brightness level is set according to the dimmer setting shown in graph (a).

Conversely, if the light source does not permit external dimming override, then the VLC circuit must accommodate communication in the presence of reduced brightness. Graph (d) depicts the resulting brightness level of the light source over time. Graph (d) looks the same as graph (a) because the manual dimmer control is not overridden for VLC. VLC may still occur during time periods n, o, q, and s. However, during time periods n and s, the VLC will occur with the light source at a reduced brightness. In some embodiments, VLC at reduced brightness may result in lower data transmit rates, reduced accuracy or redundancy, or both.

Figure 11:
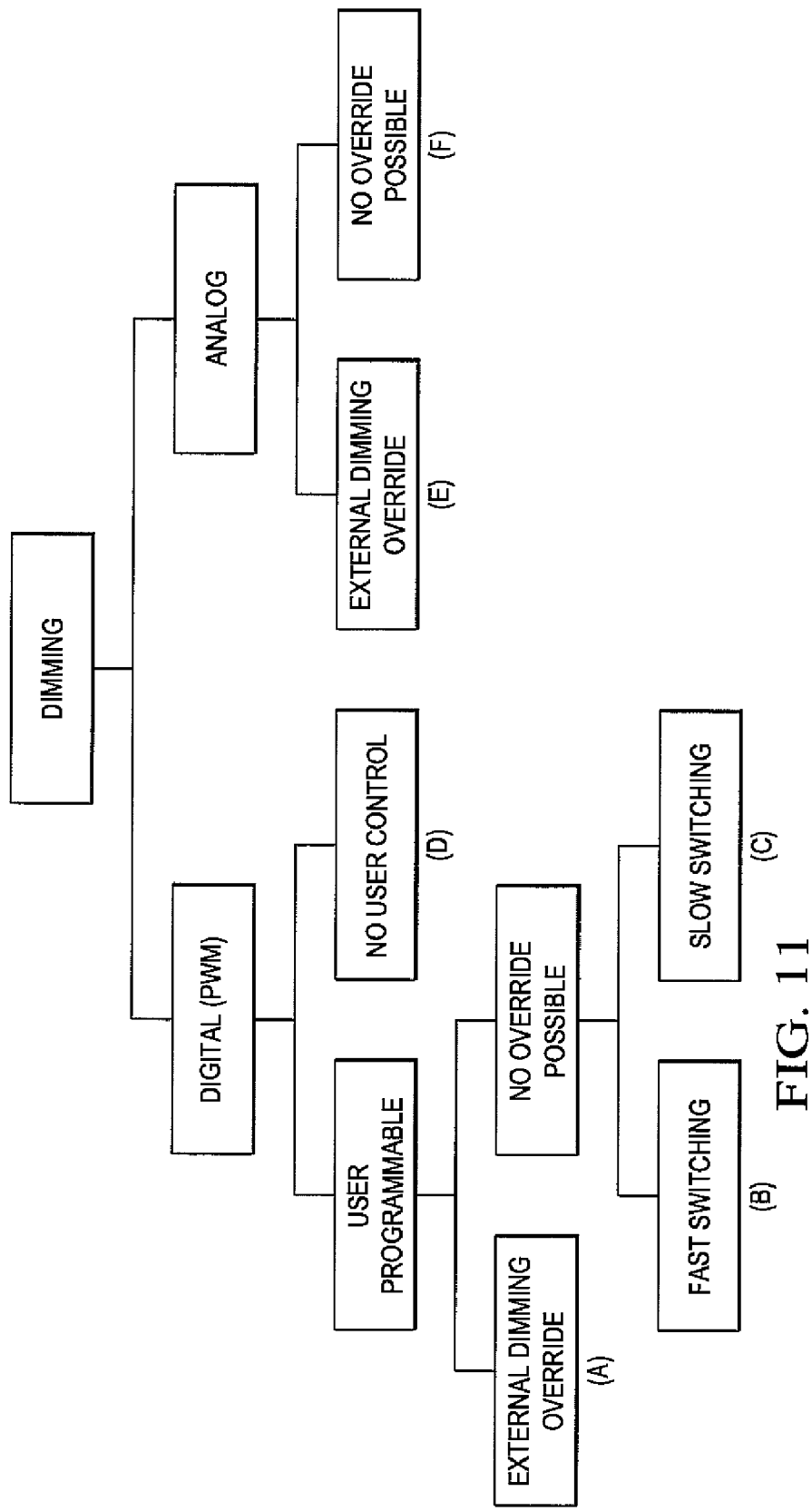
FIG. 11 shows a tree view of several embodiments of dimmer support.

Several embodiments of VLC communication in environments with dimmable light will now be discussed. While the following embodiments are described with reference to LED light sources, it is contemplated that other light sources (e.g., incandescent, fluorescent, tungsten lamp, plasma, halogen, etc.) may be used and are within the scope of the present disclosure. Furthermore, there may be only one light source or more than one light source configured for VLC communication. In order to provide context to each embodiment, FIG. 11 shows a tree view of the classifications of the various embodiments. The single letter below each box is a reference indicator for that embodiment.

Case A provides external dimming override for VLC communication

Case B does not provide external dimming override, but allows switching the PWM driver at a suitably fast data rate to maintain communication at the modulation rate (fast switching).

Case C provides a switchable PWM driver that is not able to switch at the modulation rate (slow switching).

Case D provides no control over either the dimmer or driver circuitry.

Case E provides analog dimming but with the possibility of an override.

Case F provides analog dimming without the possibility of an override.

Each of these embodiments will now be discussed.

Figure 12:
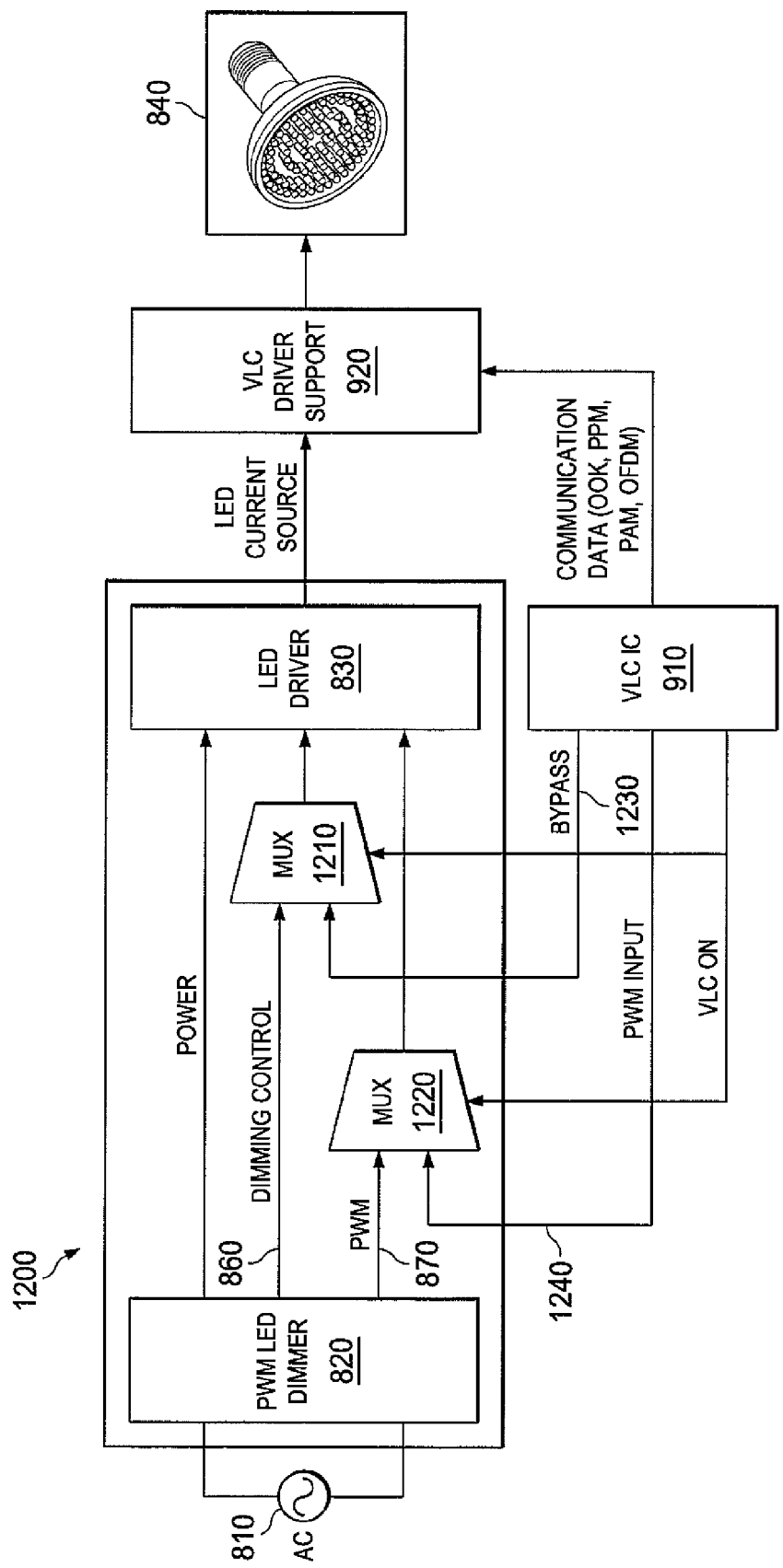
FIG. 12 depicts a VLC system that permits external dimming override, according to one embodiment of the present disclosure.

FIG. 12 depicts a VLC system that permits external dimming override, according to one embodiment of the present disclosure (case A). System 1200 includes power source 810, LED dimmer circuitry 820, LED driver circuitry 830, LED light source 840, dimming control 860, PWM input 870, VLC circuitry 910, and VLC driver support circuitry 920, as seen in FIG. 9. System 1200 also includes two multiplexers 1210 and 1220. Dimmer control 860 and PWM input 870 are now inputs of multiplexer 1210 and 1220, respectively. Bypass signal 1230 originates at VLC circuitry 910 and is input into multiplexer 1210. PWM input 1240 also originates at VLC circuitry 910 and is input into multiplexer 1220.

During VLC operation, LED driver 830 receives bypass signal 1230 and PWM input 1240 from VLC circuitry 910. These signals cause LED driver 830 to bypass dimmer control 860 and PWM input 870. As a result, light source 840 is set to maximum brightness to facilitate VLC communication. As soon as the VLC communication is completed, LED dimmer circuitry 820 regains control of LED driver 830 and resumes normal operation. Manufacturers may decide to use this embodiment while designing an integrated solution for dimmers, drivers and VLC once VLC standardization is completed.

Figure 13:
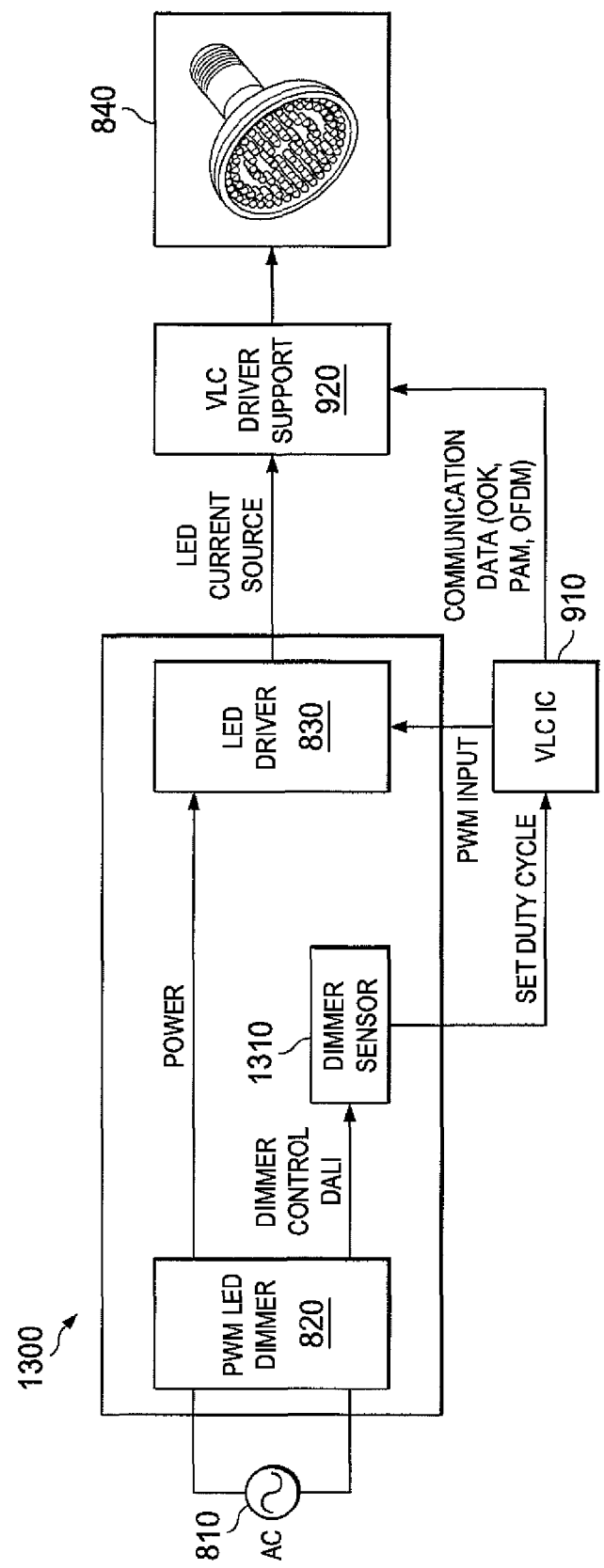
FIG. 13 depicts a VLC system where external dimming override is not possible or not required, according to one embodiment of the present disclosure.

FIG. 13 depicts a VLC system where external dimming override is not possible or not required, according to one embodiment of the present disclosure (cases B and C). System 1300 includes power source 810, LED dimmer circuitry 820, LED driver circuitry 830, LED light source 840, VLC circuitry 910, and VLC driver support circuitry 920, as seen in FIG. 9. System 1300 also includes dimmer sensor 1310. In this embodiment, dimmer sensor 1310 senses the configuration of LED dimmer circuitry 820 using DALI or other digital dimmer control mechanisms. Dimmer sensor 1310 then provides the dimmer configuration or duty cycle as an input to the VLC circuitry 910. VLC circuitry 910 can then adapt its data rate and/or modulation scheme depending on the dimmer setting along with any associated PWM signal generation in order to support dimming. In the case of slow switching (case C), a medium access controller (MAC) (not shown) could adapt its transmission schedule and resource allocation to co-exist with dimming.

Figure 14:
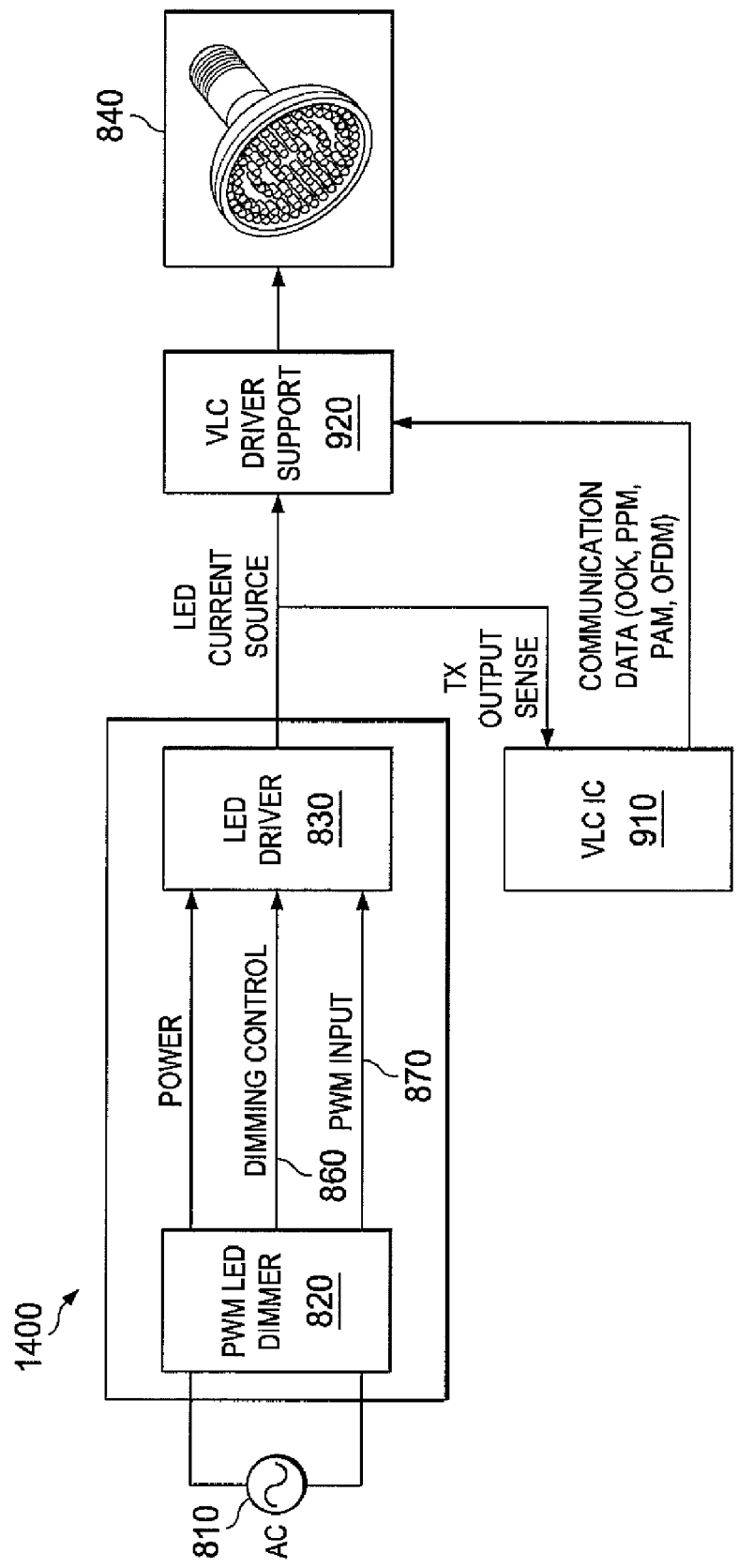
FIG. 14 depicts a VLC system where it is not possible or not required to control the LED driver, according to one embodiment of present disclosure.

FIG. 14 depicts a VLC system where it is not possible or not required to control the LED driver, according to one embodiment of the present disclosure (case D). System 1400 includes power source 810, LED dimmer circuitry 820, LED driver circuitry 830, LED light source 840, dimming control 860, PWM input 870, VLC circuitry 910, and VLC driver support circuitry 920, as seen in FIG. 9. In this embodiment, VLC circuitry 910 senses the output of LED driver 830 to investigate the dimming level and the PWM duty cycle and frequency used. VLC circuitry 910 then adapts its transmission schedule, data rate and resource allocation in order to co-exist with the PWM dimming control.

Figure 15:
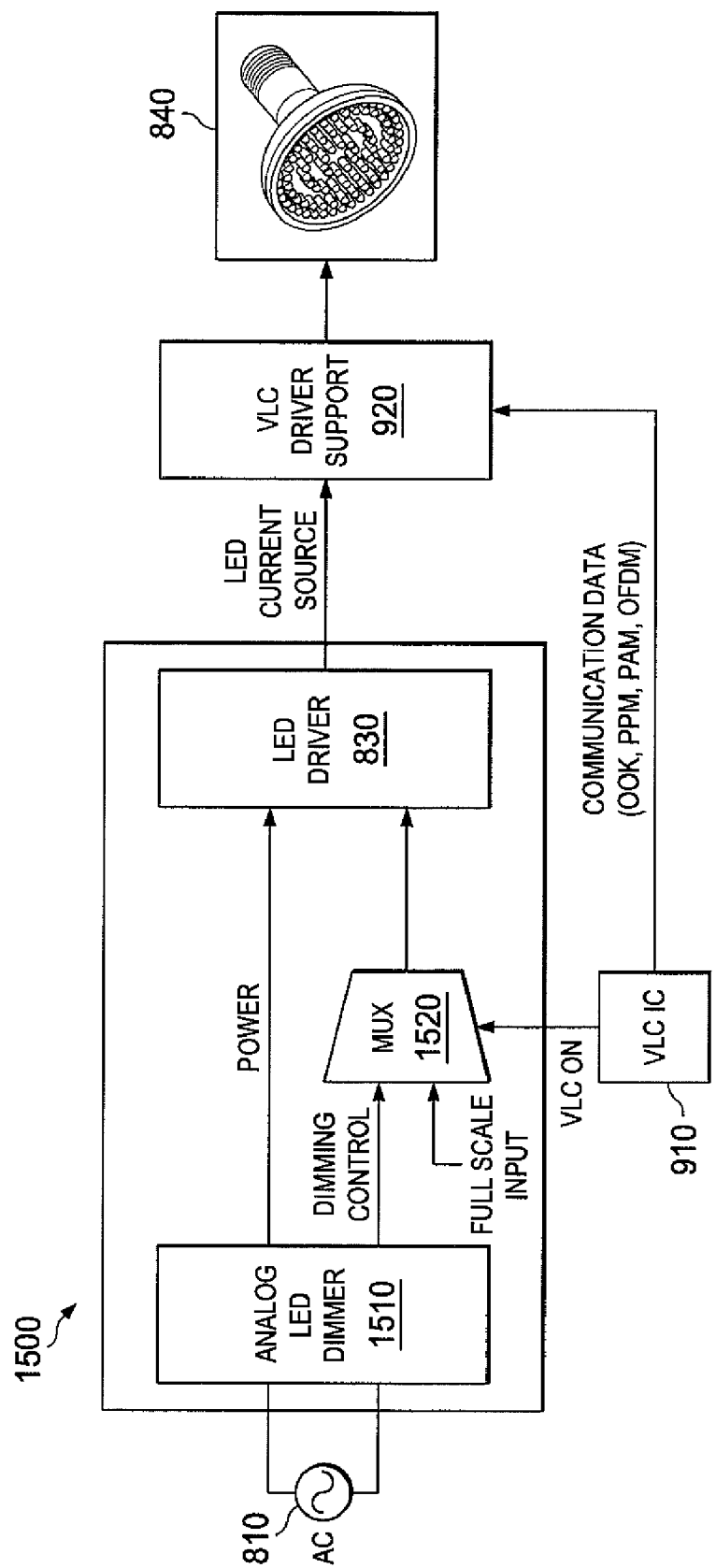
FIG. 15 depicts a VLC system that utilizes analog dimming, according to one embodiment of present disclosure.

FIG. 15 depicts a VLC system that utilizes analog dimming, according to one embodiment of the present disclosure (case E). System 1500 includes power source 810, LED driver circuitry 830, LED light source 840, VLC circuitry 910, and VLC driver support circuitry 920, as seen in FIG. 9. System 1500 also includes analog LED dimmer circuitry 1510 and multiplexer 1520. During VLC communication, signals from VLC circuitry 910 override the analog dimming control signal from analog LED dimmer 1510. Although analog dimming does not pose an issue in VLC like PWM does in digital dimming, there is still transmit light intensity degradation due to dimming. The override mechanism in system 1500 can mitigate the degradation in order to facilitate VLC.

Figure 16:
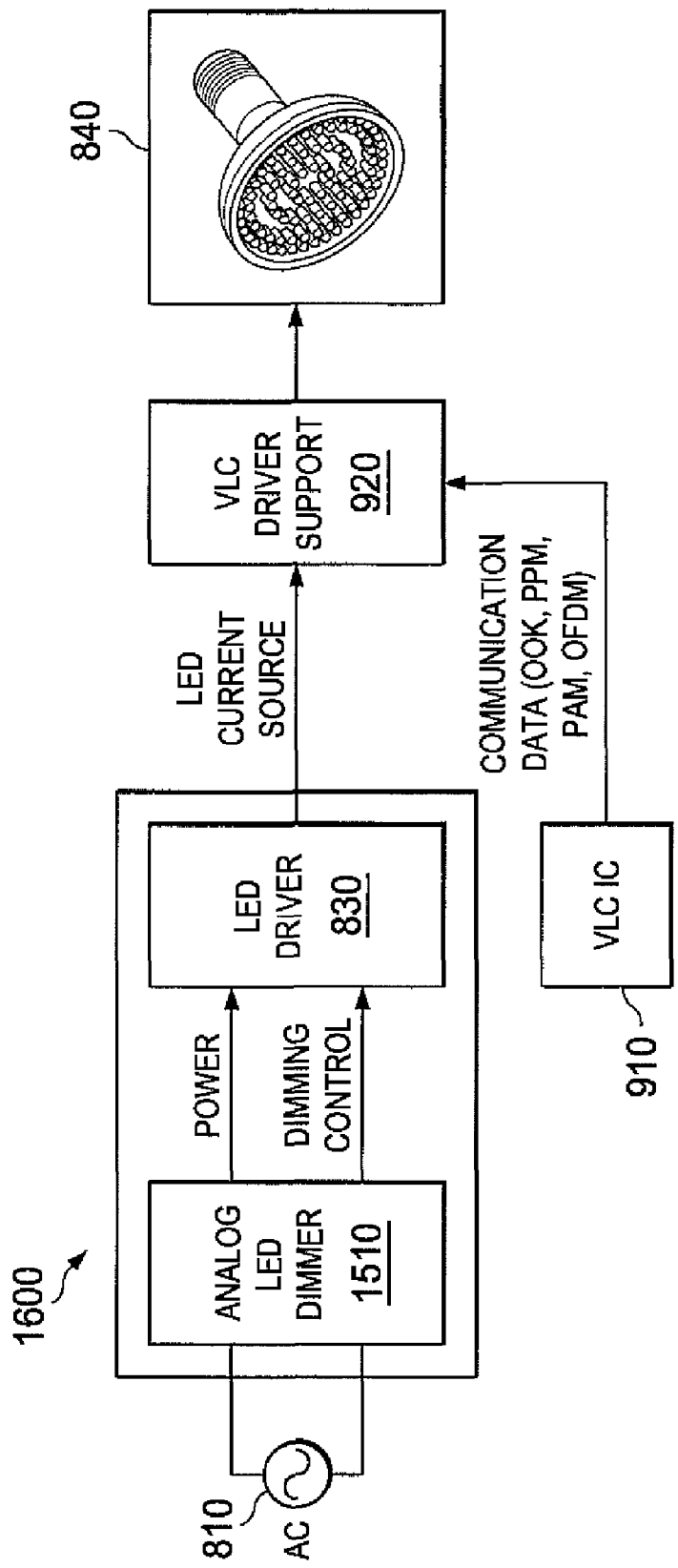
FIG. 16 depicts a VLC system that utilizes analog dimming without external dimming override, according to one embodiment of present disclosure.

FIG. 16 depicts a VLC system that utilizes analog dimming without external dimming override, according to one embodiment of present disclosure (case F). System 1600 includes power source 810, LED driver circuitry 830, LED light source 840, VLC circuitry 910, VLC driver support circuitry 920, and analog LED dimmer circuitry 1510, as seen in FIG. 15. System 1600 does not include a dimming override mechanism, like system 1500. In this case, the MAC (not shown) will use an automatic rate selection algorithm in order to adjust its link when dimming is used.

Figure 17:
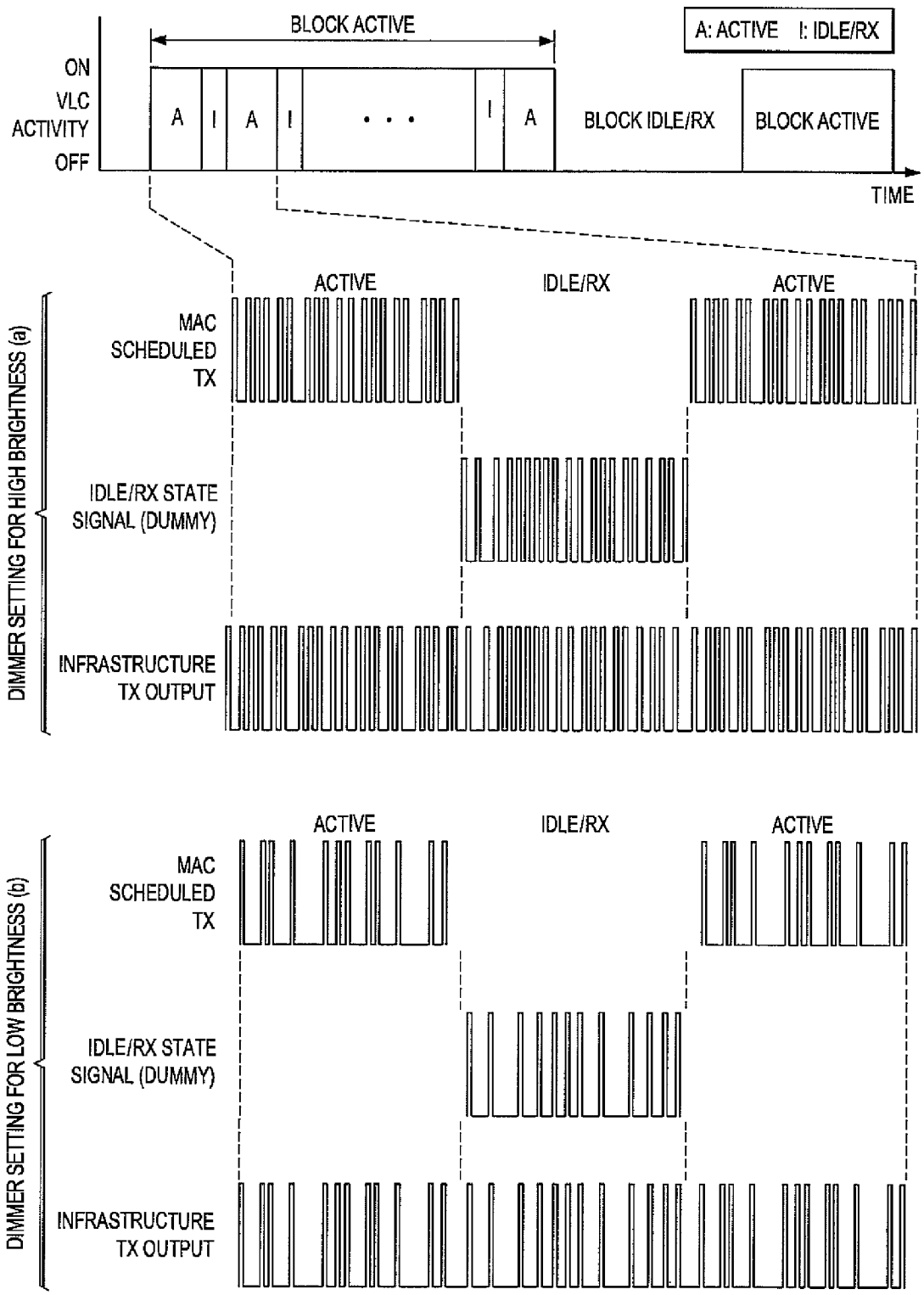
FIG. 17 depicts an idle/receiving state signal that is transmitted during idle or receiving states of an infrastructure light source, according to one embodiment of the present disclosure.

FIG. 17 depicts an idle/receiving (idle/RX) state signal that is transmitted during idle or receiving states of an infrastructure light source, according to one embodiment of the present disclosure. If a light source transmits at certain intervals, and is then idle between those intervals, visible flicker in the light source can result. An idle/receiving state signal can be used to maintain optimal visibility and flicker-free operation during idle or receiving periods at the infrastructure. This is accomplished by the idle/receiving signal mimicking the general pattern of the active transmission signal. Specifically, the idle/receiving signal has generally the same duty cycle that is used during the active signal.

Looking at the signals in part (a) of FIG. 17, it is seen that two active PWM transmission blocks are separated by an idle/receiving block. To reduce flickering, a "dimming pattern" signal is generated to be transmitted during the idle/receiving block. When the dimming pattern signal is transmitted during the idle/receiving block, the result is a substantially regular output signal by the light source. Accordingly, the flicker or visibility effects that would be seen during idle periods are reduced or eliminated. The signals in part (a) reflect a dimmer control that is set to high brightness.

A similar example is seen in the signals shown in part (b) of FIG. 17. Here, the dimmer control is set to low brightness. Thus, the overall duty cycle of the active transmission signals is reduced. Thus, the idle/receiving dimming pattern signal also features a reduced duty cycle to closely mimic the active transmission signals. The resulting output of the light source is a substantially regular output signal.

There are several advantages of using such an idle/receiving state signal instead of a constant-level (i.e., steady) signal. One advantage is that an idle/receiving state signal is more suitable for use with PWM circuits that need an on/off pattern. A second advantage is that one can use the idle/receiving state signal for other communication purposes, apart from just being a dimming pattern signal. It can be used for conveying information such as synchronization, channel estimation, providing timing information and beaconing for device discovery and to help improve the performance of the VLC link. Since power consumption is not a major issue for infrastructure devices, the idle/receiving state signal could continue broadcasting even after the end of the communication session to help initiate faster responses for device discovery.

In certain embodiments, the idle/receiving signal can be designed using a specific pattern that repeats over time to allow dimming ratios from 0.1 to 100%. The repeating pattern for the signal could be something very simple such as a square wave PWM signal with the duty cycle corresponding to the dimming ratio.

Table 2 shows examples of simple idle/receiving signal patterns that can be used depending on the dimmer setting. More complex dimmer waveforms could also be designed to help with synchronization, preamble design, device discovery etc. Different dimming devices may have different dimmer settings and different patterns. Different dimming devices could also have the same dimmer setting but may have different patterns based on the information they want to convey. The dimming pattern should be designed such that the receiver can readily support the dimming pattern.

TABLE 2

Examples of idle/receiving signal patterns

| Dimmer setting | Example of idle/receiving signal used |
| --- | --- |
| 0.1% | 1 0 0 . . . (999 zeros) 1 0 0 . . . (999 zeros) |
| 50% | 1 1 1 . . . (500 ones) 0 0 0 . . . (500 zeros) 1 1 1 . . . (500 ones) 0 0 0 . . . (500 zeros) |
| 50% (alternate) | 1 0 1 0 1 0 1 0 . . . |

Figure 18:
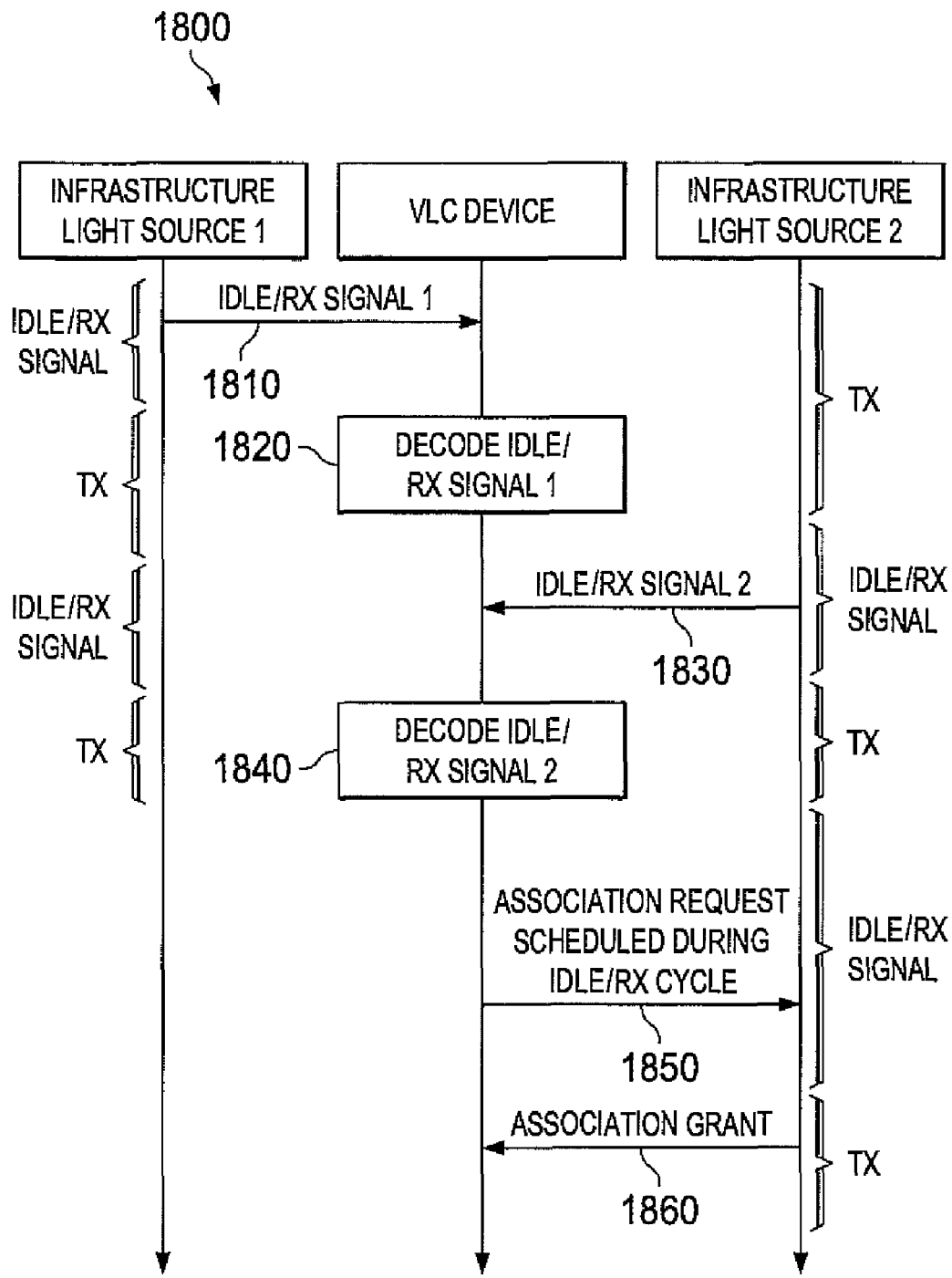
FIG. 18 depicts a process for device discovery that uses the idle/receiving signal for device discovery, according to one embodiment of the present disclosure.

FIG. 18 depicts a process for device discovery that uses the idle/receiving signal for device discovery, according to one embodiment of the present disclosure. When the infrastructure device is dimming and there is no VLC communication established between the device and infrastructure, information about beaconing, association, and the timing for listening can be sent in the idle/receiving signal. The device can then decide to associate and send an association request at the appropriate time, such as the next idle/receiving interval when the infrastructure VLC is listening.

In process 1800, a VLC device (i.e., any device that receives VLC transmissions) receives idle/receiving information for infrastructure light source 1 (step 1810) and decodes the information (step 1820). The VLC device decides not to associate with it based on the information received from the idle/receiving signal. The VLC device then receives (step 1830) and decodes (step 1840) an idle/receiving signal from infrastructure light source 2. The VLC device decides to associate with it and sends an association request at an appropriate time (such as the next idle/receiving interval) based on the information received from decoding the signal (step 1850). The infrastructure light source 2 then provides an association grant and the devices can now communicate with each other in a VLC session (step 1860).

Figure 19:
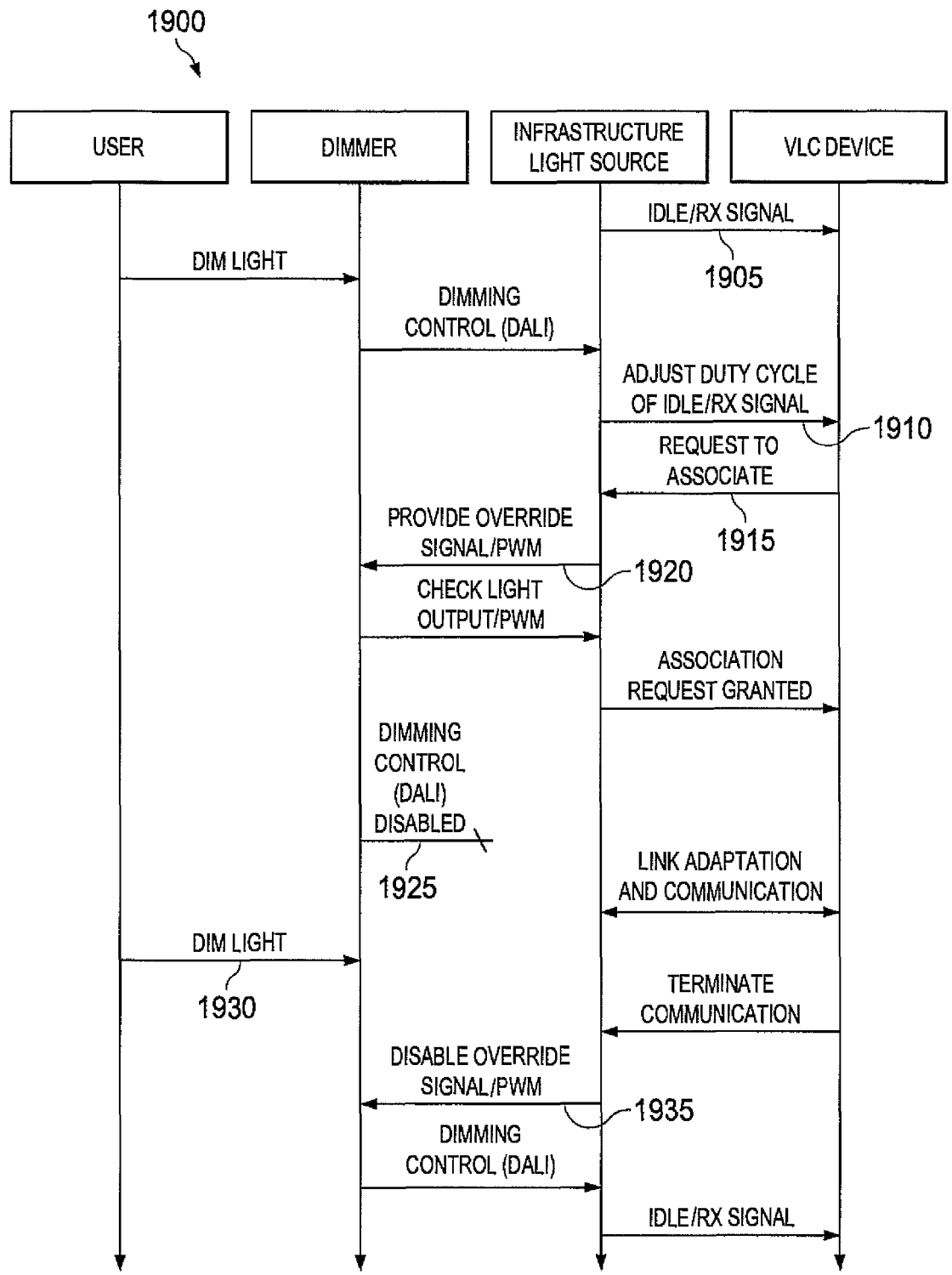
FIG. 19 depicts a process in which an infrastructure light source and a VLC device exchange information using an external dimming override, according to one embodiment of the present disclosure.

FIG. 19 depicts a process in which the infrastructure light source and the VLC device exchange information using an external dimming override, according to one embodiment of the present disclosure. An override signal is generated by the VLC circuitry in the infrastructure light source when a VLC session is to be started. The override signal is used for external dimming override as described earlier in case A in FIG. 12.

Process 1900 follows a communication in which the infrastructure light source and the VLC device exchange information using an external dimming override in order to temporarily interrupt the dimming. Initially, the infrastructure light source may be in the block idle/receiving mode by default (step 1905). When the infrastructure light source receives a dimming control from the dimmer, it will adjust the duty cycle of idle/receiving signal (step 1910). If the infrastructure light source receives signaling of communication (e.g. the request to associate, handover request, etc.) from the VLC device (step 1915), then the infrastructure light source sends an override signal to the dimmer (step 1920). Once the override signal is received by the dimmer, the dimming control signal will be disabled (step 1925). Even if the user wants to dim the light at a later time during the communication session (step 1930), the light source will not respond to the user until the communication session is completed. The infrastructure light source sends a disable override signal (step 1935) to the dimmer when an event occurs (e.g., when the communication of the VLC device and infrastructure light source is terminated, or some timer expires, etc.), at which point the dimmer circuit regains control of the infrastructure light source.

Figure 20:
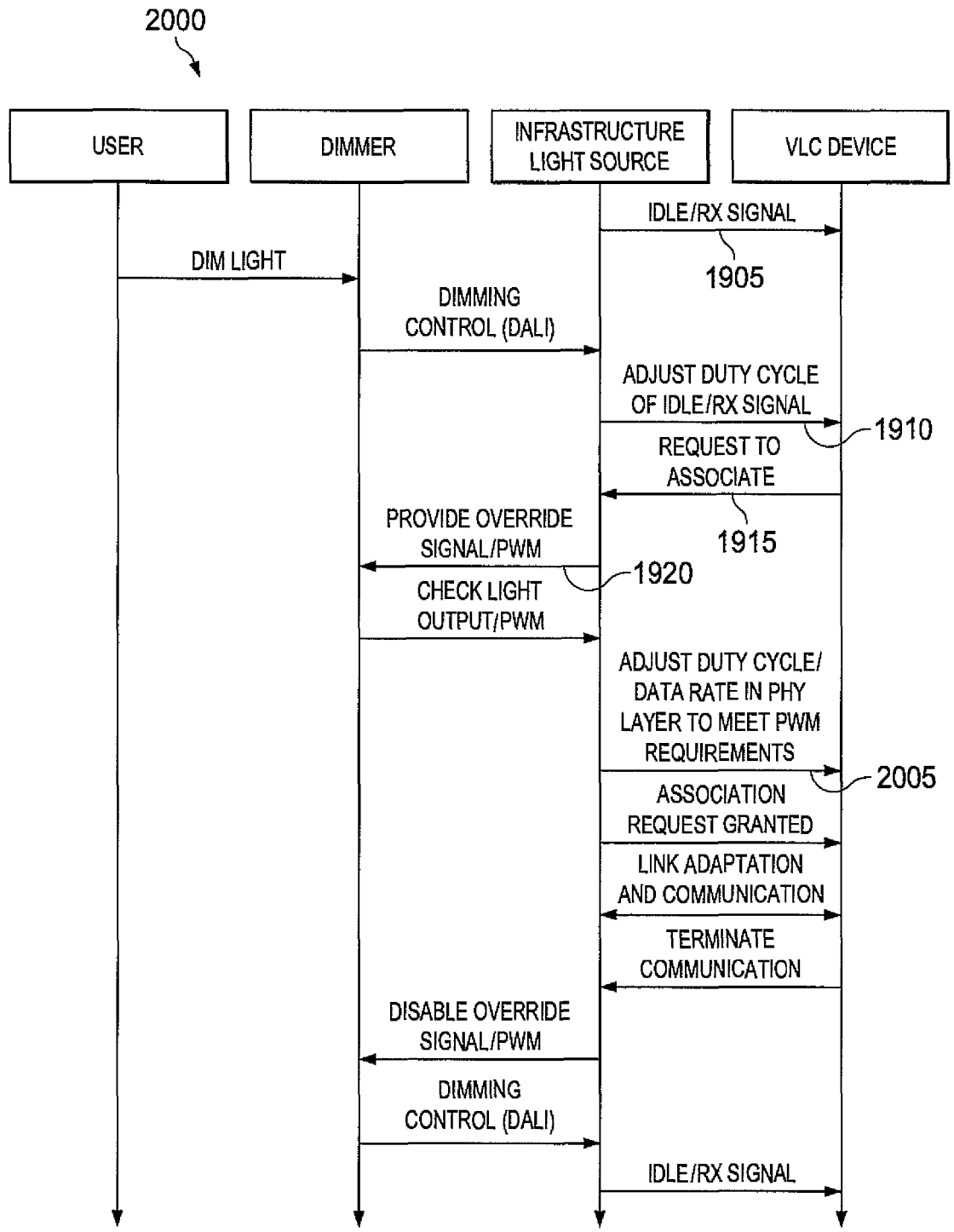
FIG. 20 depicts a communication process that adapts a physical layer data rate, duty cycle and modulation scheme, according to one embodiment of the present disclosure.

FIG. 20 depicts a communication process that adapts the physical layer data rate, duty cycle and modulation scheme, according to one embodiment of the present disclosure. This process corresponds to the VLC system for cases B and C in FIG. 13.

Process 2000 includes steps 1905, 1910, 1915, and 1920 as described in FIG. 19. However, rather than using an external dimming override, the infrastructure light source adjusts one or more physical layer configuration parameters (e.g., duty cycle, data rate, or modulation schemes, etc.) (step 2005). The adjustments are based on a dimming control external input from an interface such as DALI. The configuration parameters are then conveyed to the VLC device. These physical layer configuration parameters can also be jointly adjusted by the PWM requirements from the dimmer, and other requirements (e.g., higher layer requirements such as quality of service, etc.).

Figure 21:
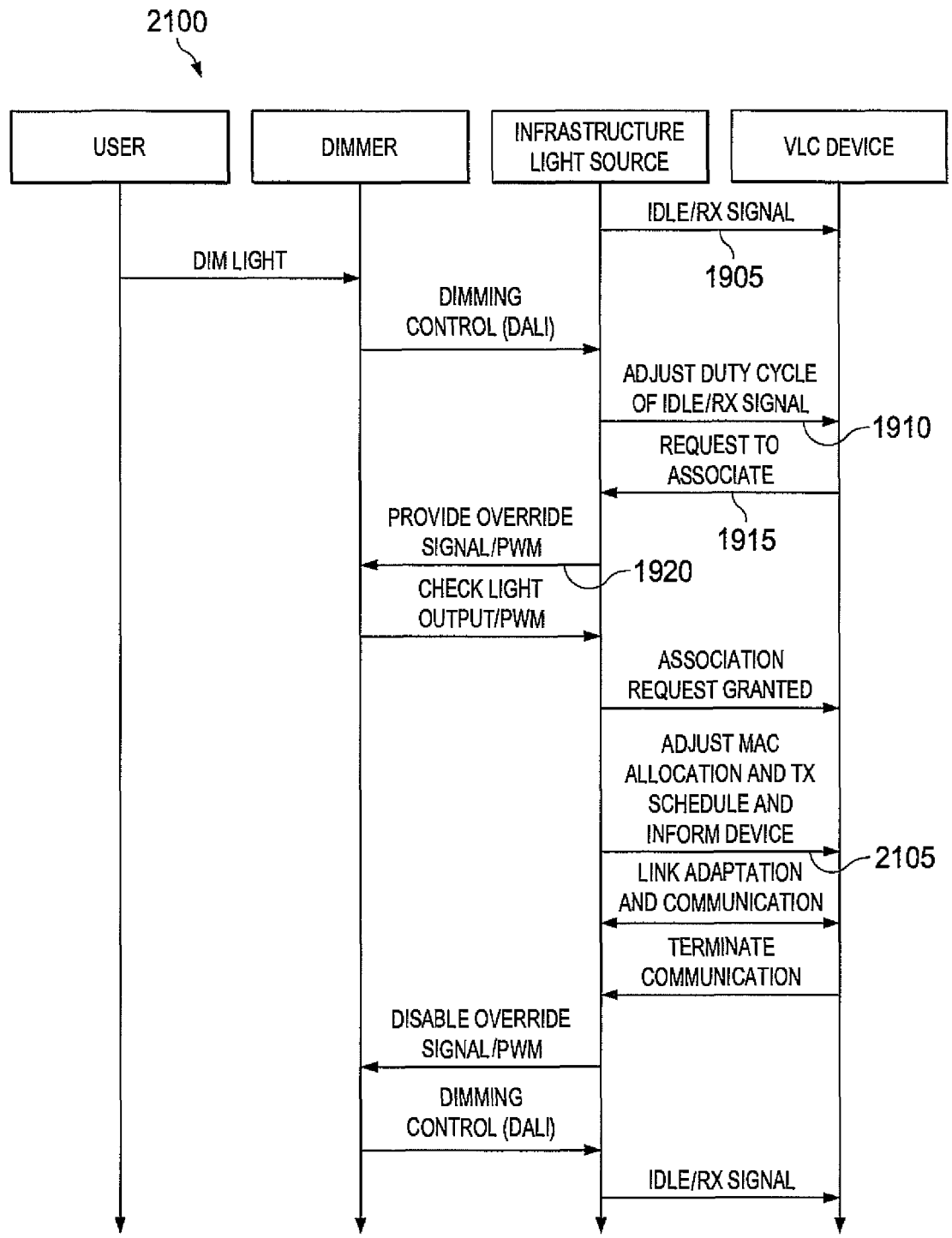
FIG. 21 depicts a communication process that includes resource allocation and scheduling changes, according to one embodiment of the present disclosure.

FIG. 21 depicts a communication process that includes resource allocation and scheduling changes, according to one embodiment of the present disclosure. The process adjusts the MAC allocation and transmission schedule for the infrastructure light source to support VLC under dimming. This may be useful in cases where the driver cannot switch at the modulation rate (slow switching) as described in case C in FIG. 13.

Process 2100 includes steps 1905, 1910, 1915, and 1920 as described in FIG. 19. However, rather than using an external dimming override, the infrastructure light source adjusts one or more MAC resource allocation parameters according to the dimming control, and informs the device of these changes (step 2105). Examples of resource allocation parameters include transmission scheduling for single/multiple types of traffic from one VLC device, transmission scheduling for multiple VLC devices, power control information, color selection, mobility support (e.g., handover), interference mitigation, etc. In certain embodiments, the infrastructure light source adjusts the resource allocation configurations based on the PWM requirements from the dimmer. These resource allocation configurations may also depend on other requirements, such as higher layer requirements, quality of service, etc.

Figure 22:
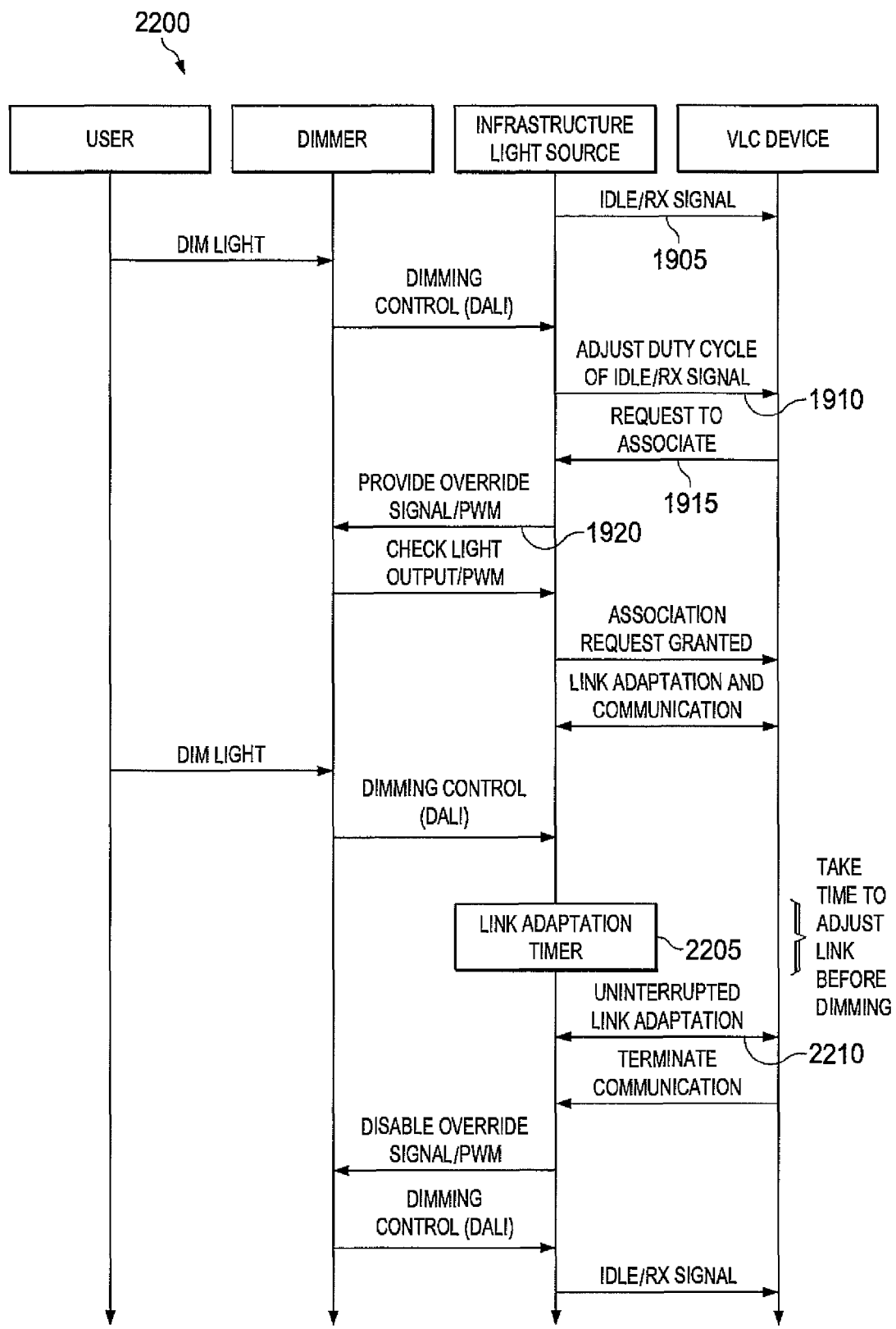
FIG. 22 depicts a communication process that includes assisted link adaptation during dimming, according to one embodiment of the present disclosure.

FIG. 22 depicts a communication process that includes assisted link adaptation during dimming, according to one embodiment of the present disclosure. Process 2200 includes steps 1905, 1910, 1915, and 1920 as described in FIG. 19. However, rather than using an external dimming override, a link adaptation timer is used delay the time between the dimming request and the actual dimming of the light source (step 2205). In certain embodiments, the MAC starts the link adaptation timer when a dimming control change is received. By delaying the dimming of the light (up to several hundred milliseconds or longer), the VLC circuitry can adapt the link between the devices to work at a new (lower) data rate (when dimmed) (step 2210) without requiring the link to be interrupted or having a possible link failure. This embodiment may be advantageous in cases where interruption of the link is possible due to dimming.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a dimmable lighting environment, a method for visible light communication (VLC), the method comprising:
   transmitting data using light from at least one light source;
   sensing that a brightness of the light is reduced below a maximum level;
   at a VLC circuitry, compensating for the reduced brightness of the light; and
   transmitting data to at least one VLC receiver using the light from the at least one light source.

2. The method as set forth in claim 1, wherein the VLC circuitry compensates for the reduced brightness of the light by:
   setting the brightness of the light to the maximum level before data is transmitted to the at least one VLC receiver; and
   setting the brightness of the light back to the reduced level after data is transmitted to the at least one VLC receiver.

3. The method as set forth in claim 1, the method further comprising:
   receiving a request to reduce the brightness of the light below the maximum level; and
   delaying the reduction of the brightness of the light for a specified interval of time,
   wherein the VLC circuitry compensates for the reduced brightness of the light by adapting a data link between the light source and the VLC receiver during the specified interval of time.

4. The method as set forth in claim 1, the method further comprising:
   transmitting a dimming pattern signal during an idle state of the at least one light source, the dimming pattern signal configured to substantially match the duty cycle of an active state of the at least one light source.

5. The method as set forth in claim 1, the method further comprising:
   transmitting a dimming pattern signal during a receiving state of the at least one light source, the dimming pattern signal configured to substantially match the duty cycle of an active state of the at least one light source.

6. The visible light communication method of claim 5, further comprising:
   adjusting one or more medium access controller (MAC) resource allocation parameters; and
   informing the at least one VLC receiver of the adjusted one or more resource allocation parameters.

7. The method as set forth in claim 1, wherein at least one of the at least one light source is an analog light source.

8. The visible light communication method of claim 1, wherein the reduced brightness is insufficient for visible light communication.

9. The visible light communication method of claim 1, further comprising:
   adjusting the brightness of the light to the suitable level by overriding the dimmer.

10. The visible light communication method of claim 1, wherein the suitable brightness level of the light source comprises a maximum brightness level of the light source.

11. The visible light communication method of claim 1, wherein the light source comprises a light emitting diode (LED) light source.

12. For use in a dimmable lighting environment, a method for visible light communication (VLC), the method comprising:
   transmitting data using light from at least one light source;
   sensing that a brightness of the light is reduced below a maximum level;
   at a VLC circuitry, accommodating one or more communication parameters for the reduced brightness of the light; and
   transmitting data to at least one VLC receiver using the light from the at least one light source.

13. The method as set forth in claim 12, wherein the VLC circuitry accommodates for the reduced brightness of the light by adapting at least one of: a data transfer rate, a duty cycle, a physical layer modulation, and a pulse width modulation (PWM) scheme of the light.

14. The method as set forth in claim 12, wherein the VLC circuitry accommodates for the reduced brightness of the light by:
- adjusting at least one medium access controller (MAC) resource allocation parameter; and
- informing the VLC receiver of the adjusted resource allocation parameters.

15. The method as set forth in claim 12, the method further comprising:
- transmitting a dimming pattern signal during an idle state of the at least one light source, the dimming pattern signal configured to substantially match the duty cycle of an active state of the at least one light source.

16. The method as set forth in claim 12, the method further comprising:
- transmitting a dimming pattern signal during a receiving state of the at least one light source, the dimming pattern signal configured to substantially match the duty cycle of an active state of the at least one light source.

17. The method as set forth in claim 12, wherein at least one of the at least one light source is an analog light source.

18. A system for visible light communication (VLC) in a dimmable lighting environment comprising:
- at least one light source configured to transmit light and transmit data to a VLC receiver using the light;
- a dimmer circuitry configured to reduce a brightness of the light from the at least one light source below a maximum level; and
- a VLC circuitry configured to compensate for the reduced brightness of the light.

19. The system as set forth in claim 18, wherein the VLC circuitry is further configured to:
- set the brightness of the light to the maximum level before data is transmitted to the VLC receiver; and
- set the brightness of the light back to the reduced level after data is transmitted to the VLC receiver.

20. The system as set forth in claim 18, wherein the VLC circuitry is further configured to:
- sense the reduced brightness of the light; and
- adapt at least one of: a data transfer rate, a duty cycle, a physical layer modulation, and a pulse width modulation (PWM) scheme of the light.

21. The system as set forth in claim 18, wherein the VLC circuitry is further configured to:
- adjust at least one medium access controller (MAC) resource allocation parameter; and
- inform the VLC receiver of the adjusted resource allocation parameters.

22. The system as set forth in claim 18, further comprising:
- a link adaptation timer configured to delay a reduction of the brightness of the light;
- wherein after the dimmer circuitry receives a request to reduce the brightness of the light below the maximum level, the link adapter timer delays the reduction of the brightness of the light for a specified interval of time and the VLC circuitry adapts a data link between the light source and the VLC receiver during the specified interval of time.

23. The system as set forth in claim 18, wherein the light source is configured to transmit a dimming pattern signal during an idle state of the light source, the dimming pattern signal configured to substantially match the duty cycle of an active state of the light source.

24. The system as set forth in claim 18, wherein the light source is configured to transmit a dimming pattern signal during a receive state of the light source, the dimming pattern signal configured to substantially match the duty cycle of an active state of the light source.

25. The system as set forth in claim 18, wherein the VLC circuitry is further configured to:
- generate an external VLC active signal; and
- transmit the external VLC active signal to a first multiplexer to bypass a dimmer brightness setting.

26. The system as set forth in claim 25, wherein the VLC circuitry is further configured to:
- generate an external pulse width modulation (PWM) signal; and
- transmit the external PWM signal to a second multiplexer to bypass a dimmer PWM setting.

27. The system as set forth in claim 18, further comprising:
- a dimmer sensor configured to send an indication of a dimmer duty cycle to the VLC circuitry, wherein the VLC circuitry uses the indication of the dimmer duty cycle to adapt a pulse width modulation (PWM) input and at least one of: a data transfer rate, a duty cycle, a physical layer modulation, and a PWM scheme of the light.

28. The system as set forth in claim 18, wherein the VLC circuitry is further configured to:
- sense an output of an LED driver circuitry to determine a dimming level; and
- use the dimming level to adapt a data transmission rate.

29. A visible light communication (VLC) method comprising:
- determining whether to transmit data from a light source to at least one VLC receiver, the light source generating light with a reduced brightness using a dimmer;
- adjusting the brightness of the light to a level suitable for visible light communication;
- transmitting the data from the light source to the at least one VLC receiver; and
- adjusting the brightness of the light source to the reduced brightness level after the transmission of data is completed.

30. A method for dimming in visible light communication (VLC), the method comprising:
- adjusting a brightness of a light by a dimmer;
- determining whether data to be transmitted to at least one VLC receiver during the adjusted brightness of the light;
- setting the adjusted brightness of the light to a maximum brightness of the light; and
- regaining the adjusted brightness of light after the transmission of data is completed.

31. The method as set forth in claim 30, wherein setting the adjusted brightness of the light to a maximum brightness is provided by:
- generating an external VLC active signal; and
- transmitting the external VLC active signal to a first multiplexer to bypass a the adjusted brightness of the light.

32. The method as set forth in claim 30, wherein setting the adjusted brightness of the light to a maximum brightness is provided by:
- generating an external pulse width modulation (PWM) signal; and
- transmitting the external PWM signal to a second multiplexer to bypass a dimmer PWM setting of the light.

33. The method as set forth in claim 30, wherein the light comprises a light emitting diode (LED) light source.

34. The method as set forth in claim 30, wherein the light comprises an analog light source.

35. The method as set forth in claim 30, further comprising:
- transmitting a dimming pattern signal during an idle state of the light, the dimming pattern signal configured to substantially match a duty cycle of an active state of the light.

* * * * *